United States Patent
Neal

(10) Patent No.: US 7,928,348 B2
(45) Date of Patent: Apr. 19, 2011

(54) ELECTROMAGNETIC DEVICE WITH INTEGRATED FLUID FLOW PATH

(75) Inventor: Griffith D. Neal, Alameda, CA (US)

(73) Assignee: Encap Technologies Inc., Alameda, CA (US)

( * ) Notice: Subject to any disclaimer, the term of this patent is extended or adjusted under 35 U.S.C. 154(b) by 1171 days.

(21) Appl. No.: 11/489,911

(22) Filed: Jul. 19, 2006

(65) Prior Publication Data

US 2008/0029506 A1 Feb. 7, 2008

(51) Int. Cl.
*H05B 6/10* (2006.01)
*H02K 9/20* (2006.01)

(52) U.S. Cl. .............................. 219/628; 310/54; 310/43

(58) Field of Classification Search .................. 219/628; 310/43, 54, 55, 67 R, 89, 90, 156.23; 165/104.14, 165/212, 214, 272.4, 285, 311; 62/101
See application file for complete search history.

(56) References Cited

U.S. PATENT DOCUMENTS

| | | | | |
|---|---|---|---|---|
| 4,678,881 A | * | 7/1987 | Griffith | 219/631 |
| 5,534,097 A | * | 7/1996 | Fasano et al. | 156/214 |
| 6,783,413 B2 | * | 8/2004 | Nakata et al. | 440/89 R |
| 2006/0055264 A1 | * | 3/2006 | Johnson et al. | 310/156.23 |
| 2007/0075463 A1 | * | 4/2007 | Huang et al. | 264/489 |

FOREIGN PATENT DOCUMENTS

JP 63118559 A * 5/1988

* cited by examiner

*Primary Examiner* — Quang T Van
(74) *Attorney, Agent, or Firm* — Brinks Hofer Gilson & Lione; Steven P. Shurtz

(57) ABSTRACT

Electromagnetic components are provided with a heat exchange mechanism. For example, a fluid-cooled electromagnetic field-functioning device, such as a motor, generator, transformer, solenoid or relay, includes one or more electrical conductors. A monolithic body of phase change material substantially encapsulates the conductors or an inductor. At least one liquid-tight coolant channel is also substantially encapsulated within the body of phase change material. The coolant channel may be part of a heat pipe or cold plate. The coolant channel may be made by molding a conduit into the body, using a "lost wax" molding process, or injecting gas into the molten phase change material while it is in the mold. The coolant channel may also be formed at the juncture between the body and a cover over the body.

27 Claims, 14 Drawing Sheets

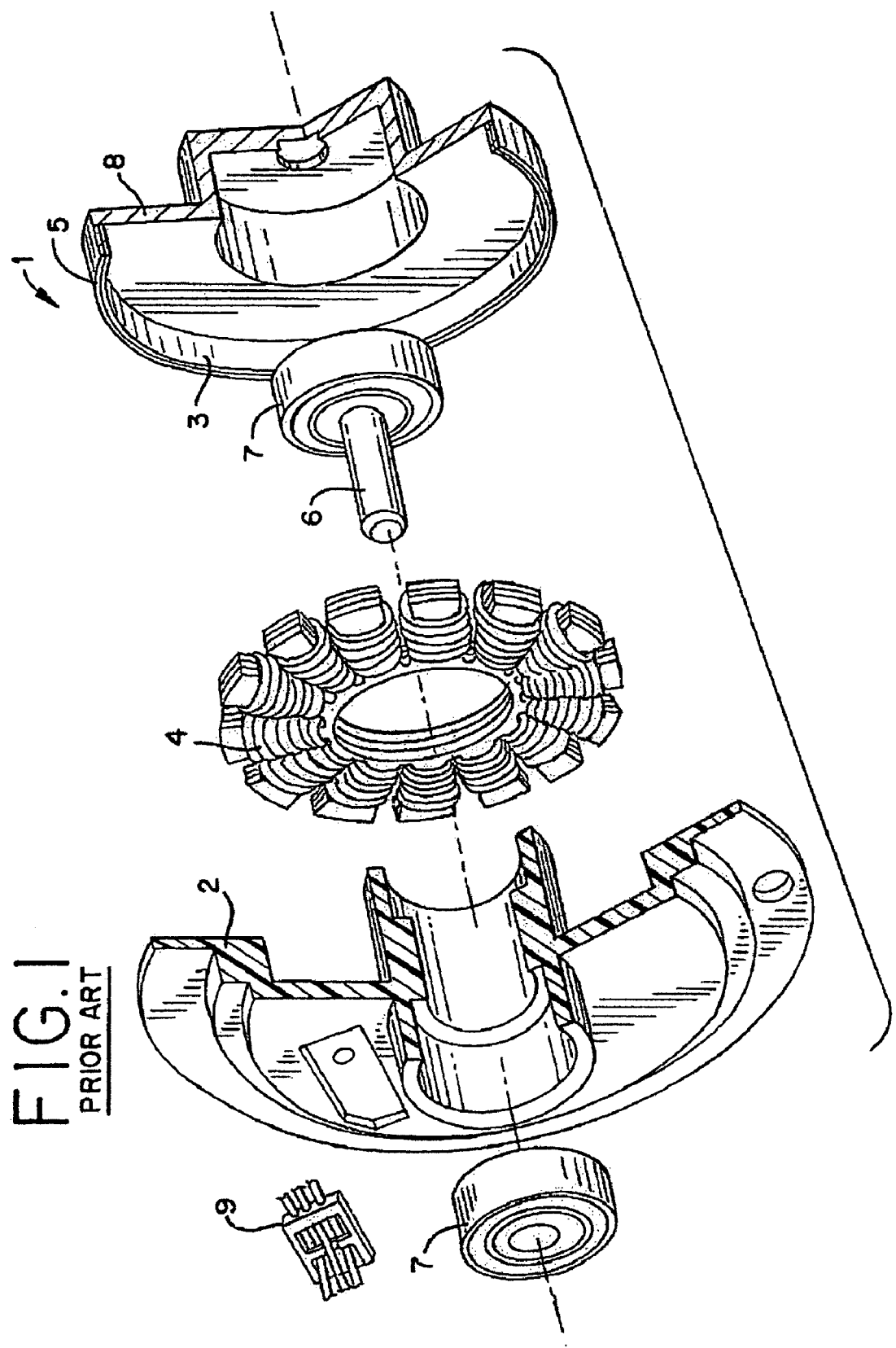

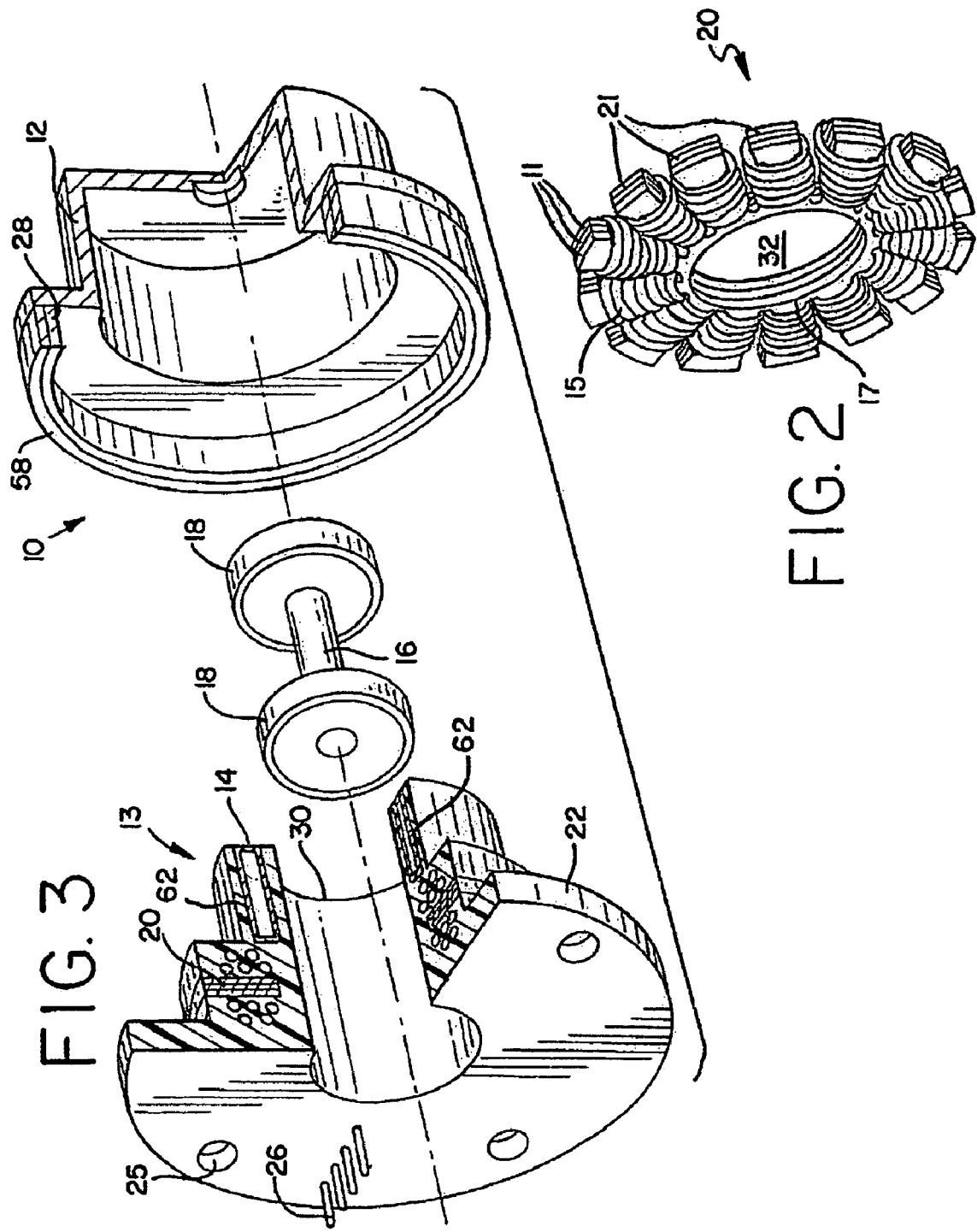

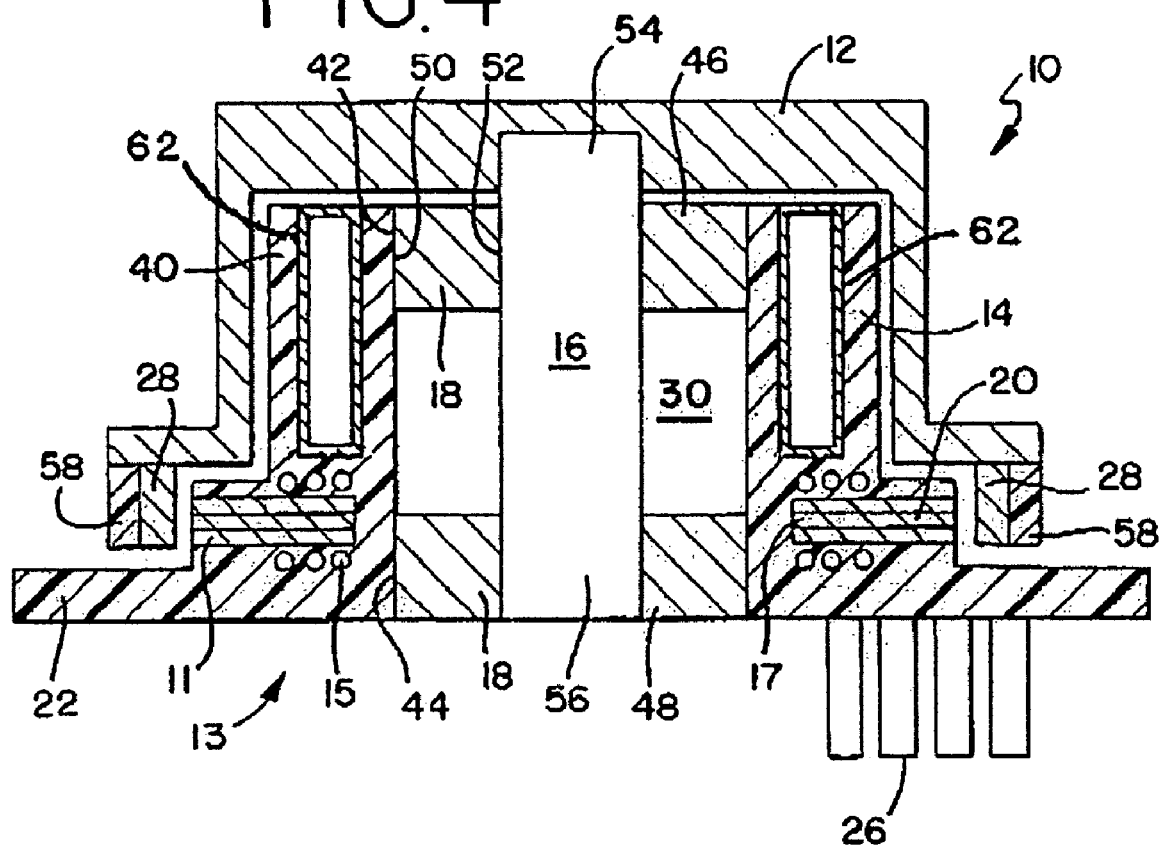

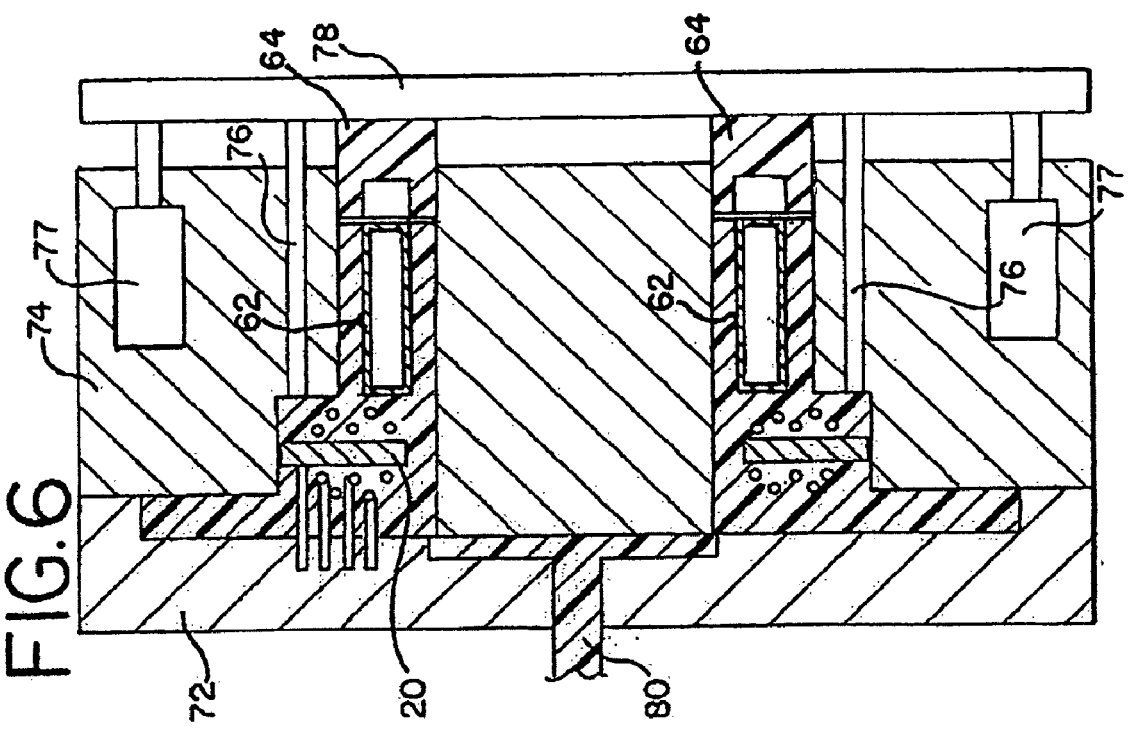
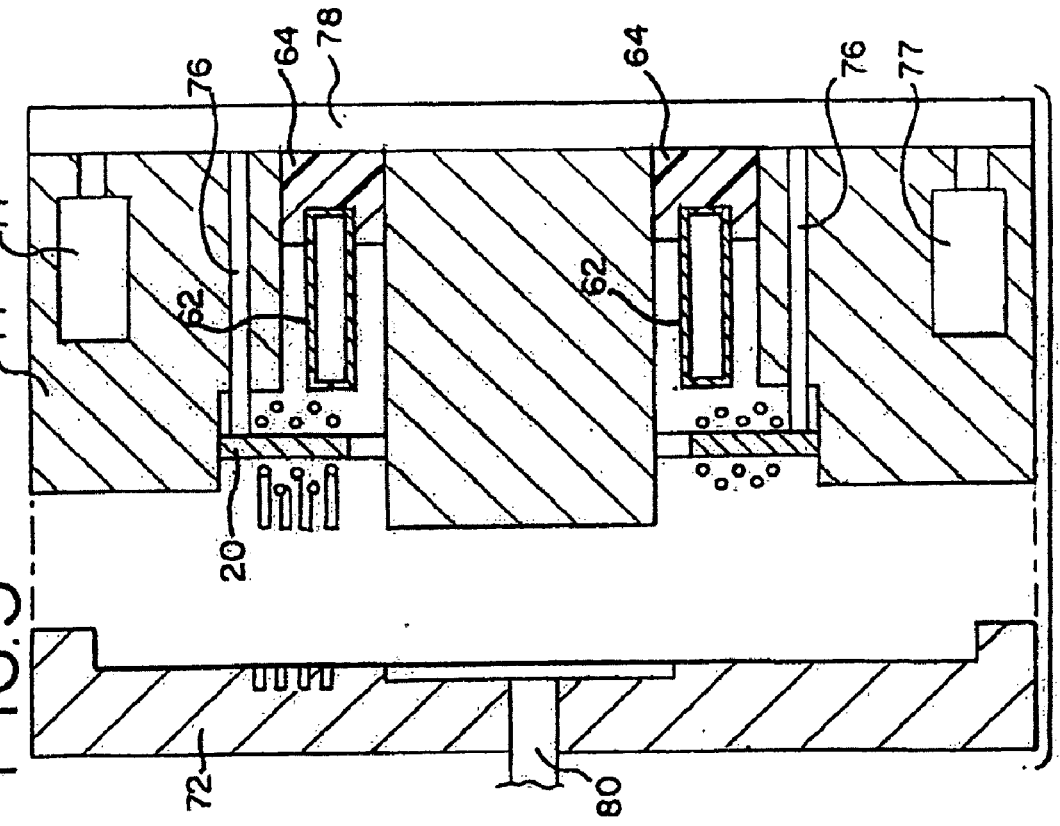

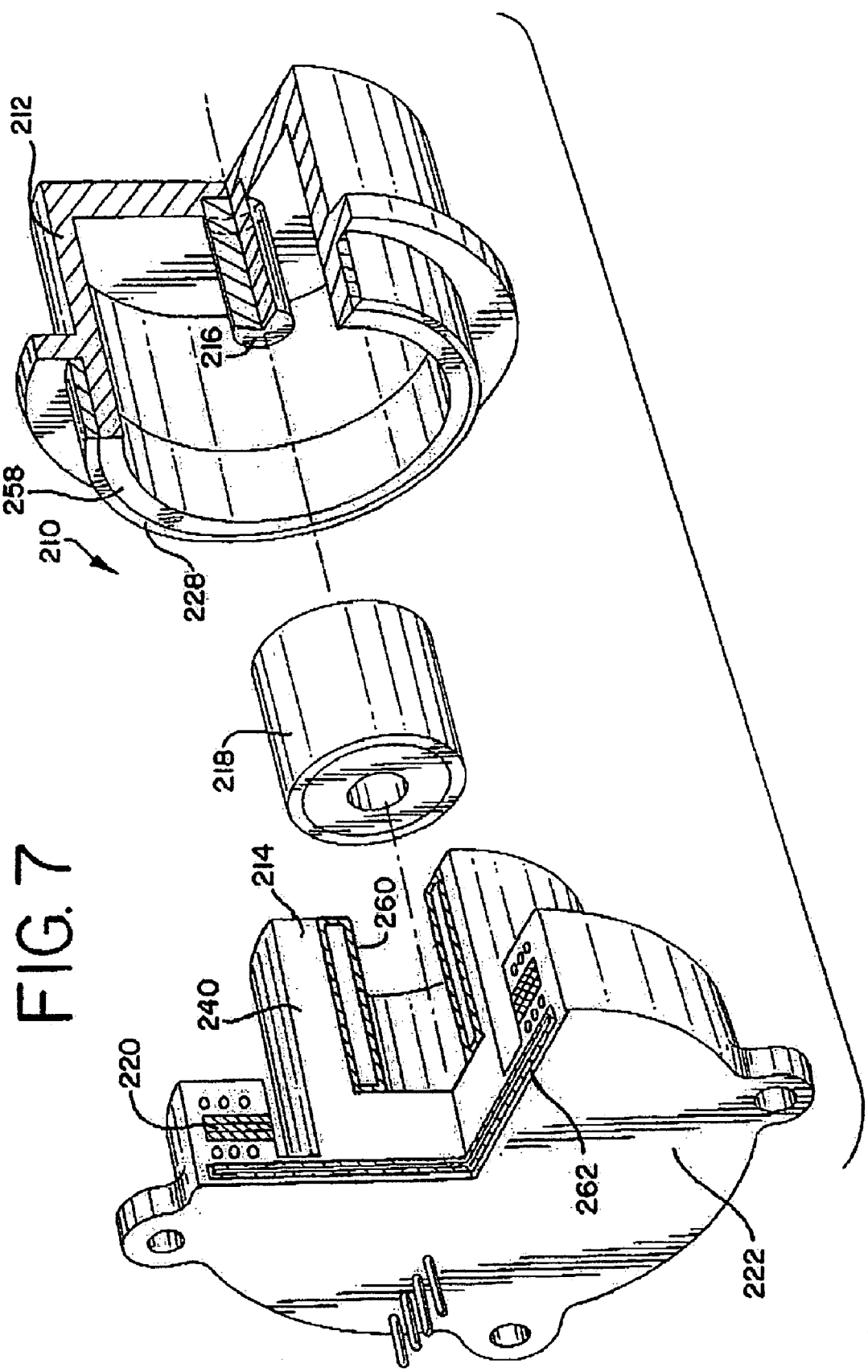

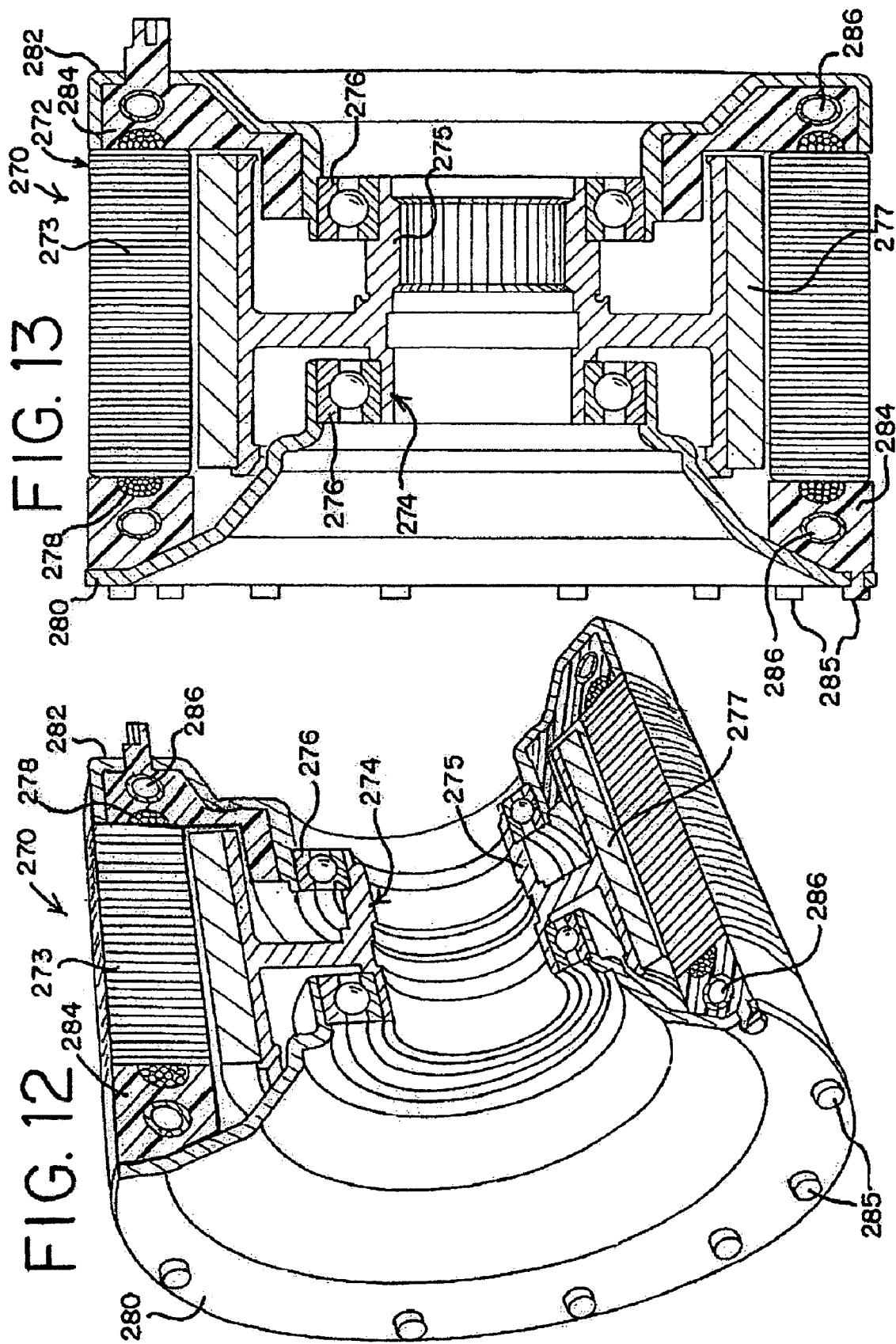

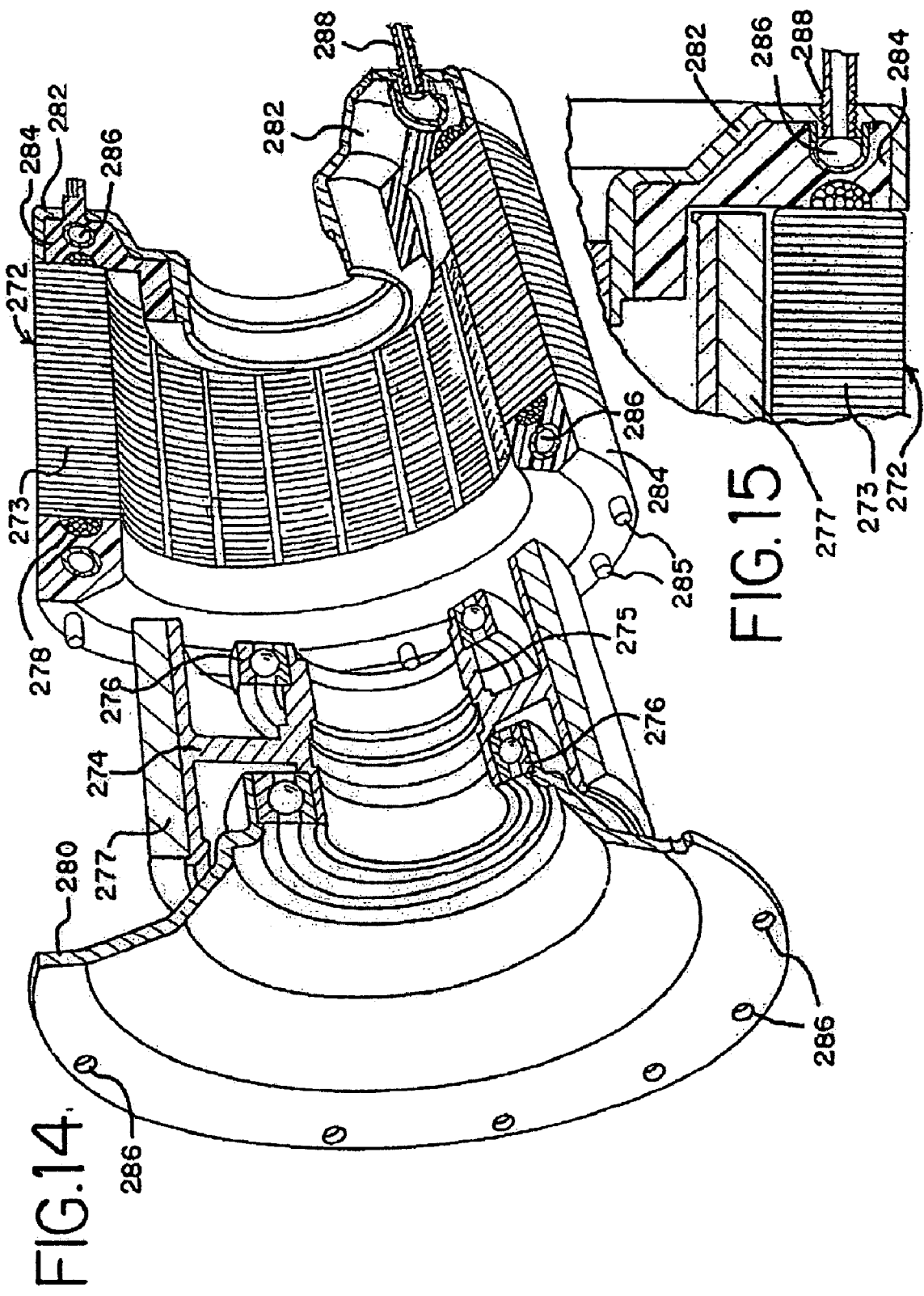

ELECTROMAGNETIC DEVICE WITH INTEGRATED FLUID FLOW PATH

FIELD OF THE INVENTION

The present invention relates generally to electromagnetic devices that include heat exchange mechanisms. It relates particularly to motors, generators, transformers, relays and solenoids that are cooled by a fluid coolant. The devices can be used in various electronic products, such as a motor for hard disc drive or other consumer electronic device, a pump motor, a motor/generator used in a hybrid electric vehicle, a motor used in an air blower and a solenoid used in a fuel injector or liquid flow valve.

BACKGROUND OF THE INVENTION

The present invention utilizes aspects of Applicant's earlier inventions, some of which are repeated herein. U.S. Pat. Nos. 6,362,554; 6,753,682 and 6,911,166, which are hereby incorporated by reference, further disclose some of these concepts.

An example of a conventional motor 1 is shown in FIG. 1. The motor 1 includes a base 2 which is usually made from die cast aluminum, a stator 4, a shaft 6, bearings 7 and a disc support member 8, also referred to as a hub. A magnet 3 and flux return ring 5 are attached to the disc support member 8. The stator 4 is separated from the base 2 using an insulator (not shown) and attached to the base 2 using a glue. Distinct structures are formed in the base 2 and the disc support member 8 to accommodate the bearings 7. One end of the shaft 6 is inserted into the bearing 7 positioned in the base 2 and the other end of the shaft 6 is placed in the bearing 7 located in the hub 8. A separate electrical connector 9 may also be inserted into the base 2.

Each of these parts must be fixed at predefined tolerances with respect to one another. Accuracy in these tolerances can significantly enhance motor performance.

An important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arrhenius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation and the resultant further heat increase. One drawback with existing motor designs is their limited effective dissipation of the heat, and difficulty in incorporating heat sinks to aid in heat dissipation. In addition, in current motors the operating temperatures generally increase as the size of the motor is decreased.

Electromagnetic devices used in electrical products may need to be cooled to remove heat generated by operation of the device. It is well known that a fluid in the environment of the device can be used to aid cooling. As an example, a method of cooling a motor is to include a fan on the motor shaft. The fan then blows air past the motor. Air, however, has a fairly low heat capacity, and thus cannot carry away as much heat as is sometime generated by the motor. Also, in some applications there is no place to mount a fan. Other fluids, and liquids in particular, typically have a high enough heat capacity that they can be used to carry away heat. For example, a water pump driven by a motor uses the water to cool the pump. The problem with liquids, however, is getting them in contact with hot motor surfaces without damaging the motor, and then collecting them to carry them away. Thus, a need exists for an improved motor that includes an effective and practical way of using a liquid to carry heat away from the motor. Also, a need exits for improved methods of cooling other electromagnetic components.

Also, there are times when the heat generated by operation of the electrical device, such as a motor, could be put to a beneficial use if there were a way to confine a fluid used in a heat transfer relationship with the device so that it could be directed to a point of desired use. Thus, if liquids or gasses could be channeled in such a way that they picked up heat from an electromagnetic device without damaging the device, and then carried that heat to a place where the heat was desired, that would be a great benefit.

One difficulty encountered in the design of electrical components is that various components need to withstand exposure to solvents and particulates. The environmental agents can corrode the conductors or inductors in the component. In pumps used for movement of corrosive agents, this can be a particular problem. In hybrid electric vehicles where the motor or generator resides inside of the transmission housing, stray metallic debris generated from the transmission gears may be thrown into the windings, damaging them to the point that the device no longer works.

BRIEF SUMMARY OF THE INVENTION

Electromagnetic devices have been invented which overcome many of the foregoing problems. In one class of devices, a heat transfer fluid flows through the device. In another class of devices, a heat transfer fluid is contained within the device. Encapsulating portions of the device at the same time a heat exchange mechanism is provided may provide the additional benefit of protecting the parts from corrosive or otherwise damaging environments.

In a first aspect, the invention is an electromagnetic field-functioning device for heating a fluid comprising at least one electrical conductor that generates heat when in use; a monolithic body of injection molded thermoplastic material substantially encapsulating the at least one conductor; and a fluid pathway in the monolithic body, with at least one fluid inlet and at least one fluid outlet to the pathway to allow for passage of fluid through the pathway, the outlet directing the fluid to a place of usage wherein heat picked up by the fluid as it transfers through the device is put to functional use.

In a second aspect, the invention is an electromagnetic field-functioning device for heating a fluid comprising at least one electrical conductor that generates heat when in use; a monolithic body of injection molded thermoplastic material substantially encapsulating the at least one conductor; and a fluid pathway in the monolithic body, with at least one fluid inlet and at least one fluid outlet to the pathway to allow for passage of fluid through the pathway, the outlet directing the fluid to a place of usage wherein heat picked up by the fluid as it transfers through the device is put to functional use, and further wherein the monolithic body completely surrounds the device except for the inlet and the outlet.

In a third aspect, the invention is an electromagnetic field-functioning device for heating a fluid comprising at least one electrical conductor and at least one inductor that generates heat when in use; a monolithic body of injection molded thermoplastic material substantially encapsulating the at least one inductor; and a fluid pathway in the monolithic body, with at least one fluid inlet and at least one fluid outlet to the pathway to allow for passage of fluid through the pathway, the outlet directing the fluid to a place of usage wherein heat picked up by the fluid as it transfers through the device is put to functional use.

In a fourth aspect, the invention is a fluid conveying mechanism comprising an electromagnetic field-functioning device having at least one electrical conductor; a monolithic body of injection molded thermoplastic material substantially encapsulating the at least one conductor; and a fluid pathway in the monolithic body, with at least one of a fluid inlet into the pathway and a fluid outlet from the pathway being formed in the body of injection molded thermoplastic, and the pathway through the body being confined within the body.

In another aspect, the invention is a fluid-cooled electromagnetic field-functioning device comprising one or more electrical conductors; a heat transfer fluid confinement member; and a monolithic body of phase change material substantially encapsulating both the one or more conductors and the heat transfer fluid confinement member.

In yet another aspect the invention is a fluid-cooled electromagnetic device comprising an assembly comprising i) an inductor in operable proximity to at least one conductor that creates at least one magnetic field when electrical current is conducted by the conductor; and ii) a body of a phase change material substantially encapsulating the conductor; and at least one liquid-tight coolant channel substantially encapsulated within the body of phase change material.

In still another aspect the invention is a fluid-cooled electromagnetic field-functioning device comprising an inductor and at least one conductor that creates at least one magnetic field when electrical current is conducted by the conductor; a heat transfer fluid confinement member containing a heat transfer fluid; and a monolithic body of phase change material substantially encapsulating at least one of the inductor and the at least one conductor, the monolithic body being in thermal contact with the heat transfer fluid.

A further aspect of the invention is a method of making a fluid-cooled electromagnetic field-functioning device comprising the steps of providing a core assembly comprising an inductor and at least one conductor that creates at least one magnetic field when electrical current is conducted by the conductor, substantially encapsulating at least one of the inductor and the at least one conductor in a body of phase change material; providing a heat transfer fluid confinement chamber in the body of phase change material; and, adding a heat transfer fluid to the confinement chamber and sealing the chamber to retain the heat transfer fluid in the chamber.

In another aspect the invention is a method of cooling an electromagnetic field-functioning device wherein the electromagnetic field-functioning device comprises one or more electrical conductors and a monolithic body of phase change material substantially encapsulating the one or more conductors, wherein a heat transfer fluid flows through a confined path substantially within the body of phase change material to transfer heat away from the conductors.

In one embodiment, a motor can be cooled by using a heat pipe embedded in a body of phase change material that also substantially encapsulates parts of the motor. In another embodiment, a motor can be cooled by passing liquid through a coolant channel encased in the body of phase change material also substantially encapsulating the motor component. The body of phase change material provides a path for the heat to be transferred from the stator to the liquid coolant, where it can be carried away. The liquid is also confined, so that it does not contact other parts of the motor or get randomly discharged from the motor. Besides motors, other electromagnetic field function devices may be made with coolant channels. The flow path or chamber for the coolant may be formed by injecting gas into the molten thermoplastic after it has been injected into a mold but before it solidifies to form the body encapsulating the motor component, or component of other electromagnetic field-functioning devices. The foregoing and other features, and the advantages of the invention, will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 1 is an exploded, partial cross-sectional and perspective view of a prior art high speed motor.

FIG. 2 is a perspective view of a stator used in a first embodiment of the present invention.

FIG. 3 is an exploded, partial cross-sectional and perspective view of a high speed motor in accordance with a first embodiment of the present invention.

FIG. 4 is a cross-sectional view of the high speed motor of FIG. 3.

FIG. 5 is a schematic drawing of a mold used to make the encapsulated stator of the motor of FIG. 3.

FIG. 6 is a schematic drawing of the mold of FIG. 5 in a closed position.

FIG. 7 is an exploded, partial cross-sectional and perspective view of a high speed motor in accordance with a second embodiment of the present invention.

FIG. 12 is a perspective, partially cross-sectional view of a motor/generator for an electric vehicle using a liquid cooling channel.

FIG. 13 is a cross sectional view of the motor/generator of FIG. 12.

FIG. 14 is an exploded and partial cross sectional view of the motor/generator of FIG. 12.

FIG. 15 is an enlarged cross-sectional view of a portion of the motor/generator of FIG. 12.

DETAILED DESCRIPTION OF THE DRAWINGS AND PREFERRED EMBODIMENTS OF THE INVENTION

Figure 8:
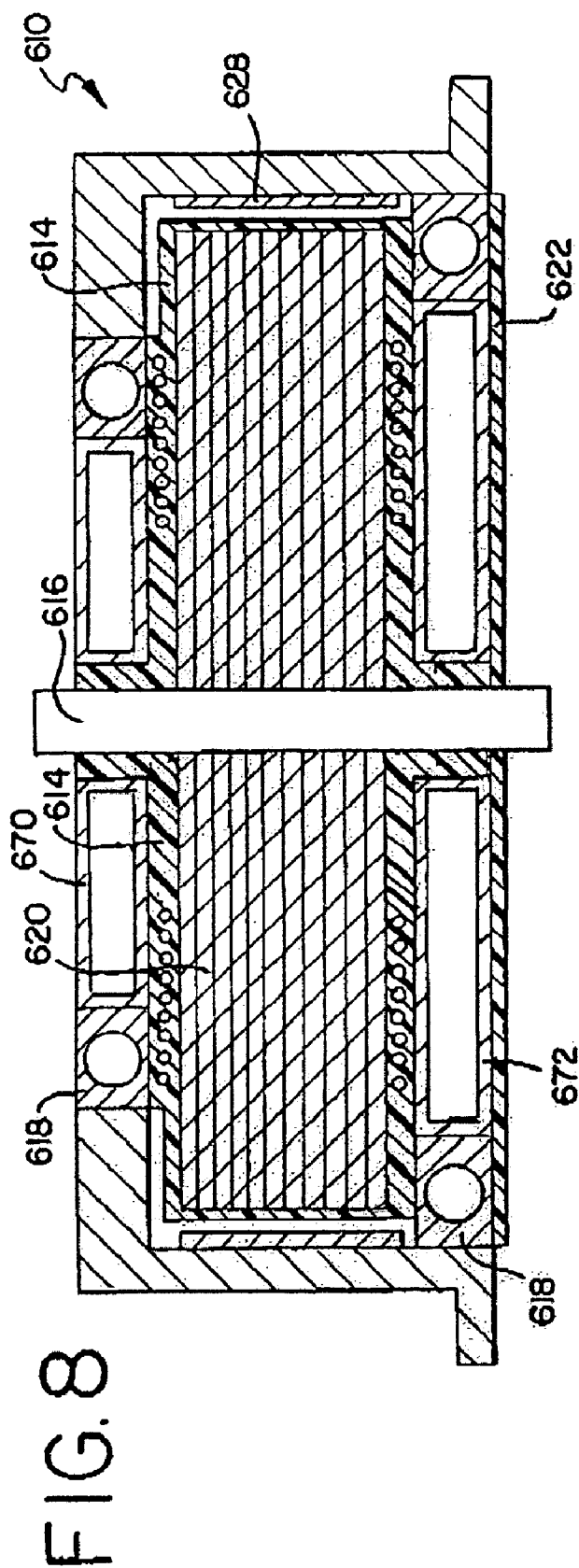
FIG. 8 is a cross-sectional view of a high speed motor in accordance with a third embodiment of the present invention.

The term "electromagnetic field-functioning device" as used in the present application includes electromagnetic devices that include one or more electrical conductors and use an electromagnetic field as part of the function of the device. In some embodiments, the device includes a moving part, and there is a relationship between movement of the moving part and flow of current in the conductors involving one or more magnetic fields. For example, in some devices, such as a motor or solenoid, current in the one or more conductors generates one or more magnetic fields, which generate a force that causes movement of the moving part. In other devices, such as a generator, the moving part generates a moving magnetic field, which in turn induces an electrical current in the one or more conductors. In some devices, like transformers, current conducted by the one or more conductors creates a magnetic field, and the magnetic field induces a current in a second conductor coupled to the magnetic field.

The term "heat transfer fluid" as used in the present application includes both liquids and gases, as well as combinations thereof. While liquids typically have a higher heat capacity per unit volume, and will therefore be more frequently used in the present invention, gases, such as air, may also serve as heat transfer fluids.

First Embodiment

A first embodiment of a motor of the present invention is shown in FIGS. 2-4. The motor may be a "high speed" motor, meaning that the motor can operate at over 5,000 rpm. The motor 10 is designed for rotating a disc or stack of discs in a computer hard disc drive. Motor 10 is formed using an encapsulation method which reduces the number of parts needed to manufacture the motor as compared with conventional motors used for disc drives, thereby reducing stack up tolerances and manufacturing costs and producing other advantages discussed below.

Referring to FIG. 2, a stator 20 is first constructed, using conventional steel laminations 11 forming a magnetically inducible core 17 having a plurality of poles 21 thereon, and wire windings 15 which serve as conductors. The conductors induce or otherwise create a plurality of magnetic fields in the core when electrical current is conducted through the conductors. In this embodiment, a magnetic field is induced in each of the poles 21.

The stator 20 is then used to construct the rest of the motor 10 (FIG. 3). The motor 10 includes a hub 12, which serves as a disc support member, the stator 20, a heat transfer fluid confinement member 62 and a body 14. Together the stator 20 and body 14 make up a stator assembly 13. The heat transfer fluid confinement member 62 constitutes a heat pipe in the embodiment of FIGS. 2-4. The heat pipe has an annular shape. Heat pipes function by containing a fluid that carries heat from a high-temperature region to a low-temperature region, and then migrates back to the high-temperature region to repeat the cycle. Many heat pipes include a liquid that vaporizes at the temperature encountered in the high-temperature region, and travels as a gas to the low-temperature region, where it condenses. The heat pipes preferably include an internal capillary structure, such as a wick, saturated with the working fluid. As heat is input at the high-temperature region (sometimes referred to as the evaporator), fluid is vaporized, creating a pressure gradient in the heat pipe. This pressure gradient forces the vapor to flow along the pipe to the low-temperature region, where it condenses, giving up its latent heat of vaporization. The working fluid is then returned to the evaporator by the capillary forces developed in the wick structure. The heat pipe is sealed to prevent loss of the heat transfer fluid. A heat pipe is thus one example of a heat transfer fluid confinement member comprising a heat transfer fluid in a sealed system. Heat pipes can be built in a variety of shapes. The internal structure of the heat pipe 62 is not shown, but may be of any known arrangement, optimized for the expected operating temperature of the motor.

The body 14 is preferably a monolithic body 14. Monolithic is defined as being formed as a single piece. The body 14 substantially encapsulates the stator 20. Substantial encapsulation means that the body 14 either entirely surrounds the stator 20, or surrounds significant areas of the stator that may be exposed. However, substantial encapsulation means that the body 14 and stator 20 are rigidly fixed together, and behave as a single component with respect to harmonic oscillation vibration.

The body 14 is preferably formed of a phase change material, meaning a material that can be used in a liquid phase to envelope the stator, but which later changes to a solid phase. There are two types of phase change materials that will be most useful in practicing the invention: temperature activated and chemically activated. A temperature activated phase change material will become molten at a higher temperature, and then solidify at a lower temperature. However, in order to be practical, the phase change material must be molten at a temperature that is low enough that it can be used to encapsulate a stator. Preferred temperature activated phase change materials will be changed from a liquid to a solid at a temperature in the range of about 200 to 700° F. The most preferred temperature activated phase change materials are thermoplastics. The preferred thermoplastic will become molten at a temperature at which it is injection-moldable, and then will be solid at normal operating temperatures for the motor. An example of a phase change material that changes phases due to a chemical reaction, and which could be used to form the body 14, is an epoxy. Other suitable phase change materials may be classified as thermosetting materials.

As shown in FIG. 4, a shaft 16 is connected to the hub or disc support member 12 and is surrounded by bearings 18, which are adjacent against the body 14. A rotor or magnet 28 is fixed to the inside of the hub 12 on a flange so as to be in operable proximity to the stator. The magnet 28 is preferably a permanent magnet, as described below. The body 14 includes a base 22. In addition, mounting features, such as apertures 25 (FIG. 3), and terminals comprising a connector 26 for connecting the conductors to an external power source are formed as a part of the stator assembly. The terminals 26 are partially encapsulated in the body 14.

The heat pipe 62 is positioned in the body 14 so that one end is near the stator 20, which will be the high-temperature region. The other end has one face that is not covered by the phase change material. This face is located just below the hub 12, so that air currents created by the spinning hub can convey heat away from the exposed face, which serves as the low-temperature region. The heat pipe 62 is substantially encapsulated in the body 14, as the body 14 surrounds almost all of the heat pipe 62 except for the minor exposed face, and the body 14 and heat pipe 62 are rigidly fixed together, and behave as a single component with respect to harmonic oscillation vibration.

Referring to FIGS. 3-4, the base 22 of the body 14 is generally connected to the hard drive case (not shown). Connecting members (not shown), such as screws, may be used to fix the base 22 to the hard drive case, using holes 25 as shown in FIG. 3. Alternatively, other types of mounting features such as connecting pins or legs may be formed as part of the base 22. The connector 26 is preferably a through-hole pin type of connector 26 and is coupled through the hard drive case to the control circuit board residing on the outer surface of the base (not shown). Alternatively the connector may be a flexible circuit with copper pads allowing spring contact interconnection.

The stator 20 is positioned in the body 14 generally in a direction perpendicular to an interior portion 30. Referring to FIG. 2, the stator 20 is preferably annular in shape and contains an open central portion 32. The poles 21 extend radially outward from this central portion 32. Faces of the poles 21 are positioned outward relative to the central portion 32 of the stator 20. The body 14 is molded around the stator 20 in a manner such that the faces of the poles are exposed and are surrounded by and aligned concentrically with respect to the disc support member 12. Alternatively, the poles may be totally encapsulated in body 14 and not be exposed.

Referring to FIG. 4, the body 14 has an upper portion 40 that extends upwardly from the stator 20. The upper portion 40 is also preferably annular shaped. The body 14 includes the interior portion 30. The interior portion 30 is generally sized and shaped to accommodate the bearings 18. The interior portion 30 includes an upper support portion 42 and a lower support portion 44. In the embodiment illustrated in FIG. 4, the interior portion 30 is preferably cylindrically shaped.

The phase change material used to make the body 14 is preferably a thermally conductive but non-electrically conductive plastic. In addition, the plastic preferably includes ceramic filler particles that enhance the thermal conductivity of the plastic so that it has a coefficient of thermal expansion similar to that of the heat pipe. In that way, as the encapsulated product changes temperature, either from cooling after been molded, or heating during operation, the body 14 will stay in close contact with the heat pipe, but will not expand faster and cause pressure on the heat pipe, or thermal hardening of the walls of the heat pipe. If the thermoplastic body and heat pipe were to separate, there would be a significant barrier to thermal conductivity across that juncture.

A preferred form of plastic is polyphenyl sulfide (PPS) sold under the trade name "Konduit" by General Electric Plastics. Grade OTF-212-11 PPS is particularly preferred. Examples of other suitable thermoplastic resins include, but are not limited to, thermoplastic resins such as 6,6-polyamide, 6-polyamide, 4,6-polyamide, 2,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

Referring to FIG. 4, the bearings 18 include an upper bearing 46 and a lower bearing 48. Also, each bearing 18 has an outer surface 50 and an inner surface 52. The outer surface 50 of the upper bearing contacts the upper support portion 42 and the outer surface 50 of the lower bearing 48 contacts the lower support portion 44. The inner surfaces 52 of the bearings 18 contact the shaft 16. The bearings are preferably annular shaped. The inner surfaces 52 of the bearings 18 may be press fit onto the shaft 16. A glue may also be used. The outer surface 50 of the bearings 18 may be press fit into the interior portion 30 of the body 14. A glue may also be used. The bearings in the embodiment shown in FIGS. 3-4 are ball bearings. Alternatively other types of bearings, such as hydrodynamic or combinations of hydrodynamic and magnetic bearings, may be used. The bearings are typically made of stainless steel.

The shaft 16 is concentrically disposed within the interior portion 30 of the body 14. The bearings 18 surround portions of the shaft 16. As described above, the inner surfaces 52 of the bearings are in contact with the shaft 16. The shaft 16 includes a top portion 54 and a bottom portion 56. The top portion 54 of the shaft 16 is fixed to the hub 12. The bottom portion 54 of the shaft 16 is free to rotate inside the lower bearing. Thus, in this embodiment, the shaft 16 is freely rotatable relative to the body 14. The shaft 16 is preferably cylindrical shaped. The shaft 16 may be made of stainless steel.

Referring to FIG. 4, the hub 12 is concentrically disposed around the body 14. The hub 12 is fixed to the shaft 16 and is spaced apart from the body 14. The hub 12 includes a flux return ring 58 and the magnet 28. The flux return ring 58 is glued to the disc support member. The magnet 28 is glued to the hub 12. As shown in FIG. 4, the magnet 28 concentrically surrounds the portion of the body 14 that includes the stator 20. In this embodiment the magnet 28 and stator 20 are generally coplanar when the motor 10 is assembled.

The magnet 28 is preferably a sintered part and is one solid piece. The magnet 28 is placed in a magnetizer which puts a plurality of discrete North and South poles onto the magnet 28, dependant on the number of poles 21 on the stator 20. The flux return ring 58 is preferably made of a magnetic steel. The hub is preferably made of aluminum. Also, the hub may be made of a magnetic material to replace the flux return ring.

As shown in FIGS. 3 and 4, the heat pipe may comprise just one circumferential loop. Of course multiple heat pipes or pipe loops could be provided in the body 14.

Operation of the First Embodiment

In operation, the motor shown in FIGS. 3-4 is driven by supplying electrical pulses to the connector 26. These pulses are used to selectively energize the windings 15 around the stator 20 poles 21. This results in a moving magnetic field. This magnetic field interacts with the magnetic field generated by the magnet 28 in a manner that causes the magnet 28 to rotate about the body 14. As a result, the hub 12 begins to rotate along with the shaft 16. The bearings 18 facilitate the rotation of the shaft 16.

The coolant is captive to the system and continuously recirculates through the hollow structure of the heat pipe 62.

Method of Making the First Embodiment

The motor 10 shown in FIGS. 3 and 4 is made in part using an encapsulation technique. This encapsulation technique involves the following steps, and uses the mold shown in FIGS. 5 and 6. First, a mold is constructed to produce a part with desired geometry. The mold has two halves 72 and 74. Also, core pins 76 and 64 are connected to a plate 78 that is activated by hydraulic cylinders 77 within the mold tool. The stator 20 and heat pipe are placed within the mold and the two halves are closed. The core pins hold the heat pipe at a predetermined distance from the stator 20. Second, using solid state process controlled injection molding, plastic is injected through gate 80 around the stator 20 and heat pipe 62 so as to encapsulate the stator 20 and form the body 14 shaped as shown in FIGS. 3 and 4 with the heat pipe 62 inside of it. As plastic flows in, pins 76 are withdrawn so that the plastic completely surrounds the stator 20, and pins 64 are withdrawn so that the plastic can cover all but the end surface of heat pipe 62.

The pressure of the injection molding operation should be controlled to not deform or damage the heat pipe. In other embodiments, discussed below, the pressure must be controlled so as to not crush a conduit filled with ice or wax. For a full description of a process which may be used to control the pressure, attention is drawn to U.S. Pat. No. 6,911,166. A summary of the information on col. 7 line 62 to col. 9, line 43 of the '166 patent follows.

An injection molding machine is used which is similar to the machines used conventionally in thermoplastic injection molding processes. A unique aspect, however, is the method for injection molding a phase change material. The injection molding apparatus suitable for use in the method comprises an injection cylinder having a resin feeding screw inside, a mold cavity, a runner, a stroke sensor and three pressure transducers.

The molten material flows into the mold cavity via the runners. Gates are placed at the end of the runner to control the flow of molten material into the mold cavity. A valve gate opens and closes the runner to the cavity. Suitable valve gates are any valves known in the injection molding art. However, it is also possible to perform the method without the use of a valve gate. In a process where no valve gates are used, the molten material is kept at a predetermined pressure in the mold cavity and is allowed to solidify. The mold cavity is opened and the part and the solidified material in the runner are ejected and then separated. The use of a valve gate eliminates the need for the separating step.

The injection molding method begins with closing the mold cavity as illustrated in FIG. 6 and opening the valve gates. Molten material fills the cavity. A stroke sensor measures the rate of plastic injection. A controller correlates this rate, the compressibility of the plastic and the size of the injection unit to determine a quantity of plastic injected with time. A first pressure transducer is associated with the beginning-of-fill point and is placed near the gate of the mold cavity. The beginning-of-fill point is the first portion of a mold cavity that is filled by molten material. Thus, the first pressure transducer is preferably placed within the first ten percent of the mold cavity to be filled by molten material. A second pressure transducer is associated with the end-of-fill point in the cavity. The end-of-fill point is the last portion of a mold cavity that is filled by molten material. Thus, the second pressure transducer is preferably placed within the last ten percent of the mold cavity to be filled by molten material. Also a third pressure transducer is placed in the runner to monitor the runner pressure. The stroke sensor measures the fill rate of the molten phase change material.

Molten material enters through the gate and quickly fills up the entire cavity. The stroke sensor and pressure transducers transmit their respective readings to a controller. The controller uses the pressure and stroke readings to determine whether to increase or decrease injection pressure and fill rate to achieve a desired fill profile and pressure gradient. Additionally the controller can be used to close the valve gate and to stop the flow of molten material into the cavity. The controller reduces the flow of molten material when the pressure at the end-of-fill point inside the cavity reaches a set point pressure. If valve gates are not utilized, the controller maintains a constant injection pressure until the material in the runner and mold cavity has solidified. When the pressure at the end-of-fill point inside the cavity reaches the set point pressure, the molten material is allowed to cool and solidify. Although the embodiment described above uses only one cavity, it is contemplated that multiple mold cavities maybe utilized.

It will be understood that each step of the process can be implemented by computer program instructions or can be done manually. The computer program instructions may be loaded onto a computer or other programmable data processing apparatus to produce a machine, such that the instructions which execute on the computer or other programmable data processing apparatus create means for implementing the desired functions. These computer program instructions may also be stored in a computer-readable memory that can direct a computer or other programmable data processing apparatus to function in a particular manner, such that the instructions stored in the computer-readable memory produce an article of manufacture. The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide steps for implementing the desired functions.

Besides injection molding of traditional thermoplastic materials, casting, roto-molding, reaction injection molding, compression molding, blow molding or combinations of these approaches may be used to make products of the present invention. For example, CBT resins from Cyclics Corporation, 2135 Technology Drive, Schenectady, N.Y. 12308, can be processed using reaction injection molding or casting to make the monolithic body. These are polybutylene terephthalate (PBT) resin systems that polymerize reactively like thermosets but have the material properties of thermoplastics, and hence produce monolithic bodies of thermoplastic material. CBT® resins come in one and two part systems—one-part systems where resin and catalyst are pre-mixed before processing, and two-part systems where resin and catalyst are mixed during processing. They can have very high filler loadings (see U.S. Pat. No. 6,960,626, incorporated herein by reference), yet be injection molded at low pressures, which make them ideal for encapsulating delicate electromagnetic parts. Higher levels of filler can result in better thermal conductivity, coefficients of linear thermal expansion that are closer to those of parts that are being encapsulated, and better vibration dampening. Low mold pressures also make it possible to use molds out of materials that are easier to shape than metal. For example, stereo lithography can be used to make intricate mold configurations very quickly and inexpensively, yet the resulting molds can be used to make injection molded parts.

After the stator assembly is formed, the shaft 16 is press fit and possibly glued into the bearings. Next, glue is placed on the outer bearing surfaces and the bearings and shaft are press fit into the interior portion 30 of the plastic body 14. It may be desirable to mold the interior portion 30 smaller than necessary and hone after the molding step to create a precise dimension for bearing insertion for the bearings being used. Next the aluminum disc support member 12 is machined and the magnet and flux return ring are glued onto the lower surfaces. The disc support member 12 is then glued to the motor shaft.

After the spindle motor and hub are assembled they can be used to construct a hard disc drive by using the holes 25 to mount the motor to the base of the hard disc drive. Thereafter, construction of the hard disc drive can follow conventional methods.

Advantages of the First Embodiment

An advantageous feature of the first embodiment is provided by the fact that the body 14 is preferably a monolithic body 14 or monolithically formed using an encapsulation technique. This monolithic body 14 provides a single structure that aligns the stator, and heat pipe relative to one another, and causes good heat transfer between the stator and the hot portion of the heat pipe. (The use of multiple parts in previous devices results in stack up tolerances and increased manufacturing costs. Conversely, the single unitized body of the present invention provides alignment for the components of a motor and couples these components to one another.) By encapsulating the body 14, and thereby molding some components as part of the body 14 and using the body to align the remaining components, stack up tolerances are substantially reduced, along with manufacturing costs. This also leads to greater motor efficiency and performance. Further, the body 14 will be cooled by the working fluid in the heat pipe 62, thus further providing a lower operating temperature for the motor.

The disclosed motor optimizes dimensional tolerances among motor components and thereby enables higher rotational speeds. The heat exchange mechanism of the heat pipe carries away the heat generated in the stator when operating at those higher speeds. The fact that the preferred body is made of thermoplastic allows the use of a type of thermoplastic with a coefficient of linear thermal expansion (CLTE) similar to that of the heat pipe, and possible the same as other motor components. As the motor heats up, and the exterior of the heat pipe gets hot, the thermoplastic will expand at a rate similar to the heat pipe, eliminating any stress. As mentioned above, it is important not to have disassociation of the thermoplastic to the heat pipe, which would thus create a gap which inhibits heat transfer. Further, it is important not to "work harden" the exterior of the heat pipe causing it to stress crack.

As discussed above, controlling heat dissipation in conventional motors is difficult to achieve. A particular thermoplastic may be chosen for encapsulating the body 14 that is designed to facilitate heat dissipation. By putting this material in intimate contact with the two heat sources (motor windings and bearing) and then creating a solid thermal conductive pathway to the heat pipe, overall motor temperature may be reduced. The fact that these inserts are encapsulated within the body, as opposed to being separately attached, simplifies the manufacturing process and allows for post machining, enabling more precise tolerances and ensures that dimensional consistency will be maintained over the life of the motor.

The disclosed motor also offers superior performance in adverse environments. This is achieved because components such as the stator and heat pipes are substantially or completely encapsulated in thermoplastic. If the motor comes in contact with materials which could corrode the conductors, laminations or heat pipes, the phase change material in the form of a thermoplastic protects them. Further materials such as glue used to attach components together are eliminated through the use of a monolithic body 14.

Other embodiments of the invention my utilize encapsulation of more than just the stator and the heat pipe. For example, the entire electromagnetic device or piece of equipment into which it is built may be encapsulated to protect it from a corrosive environment, such as a fluid pump immersed in liquid ammonia, or an electromagnetic device in an environment where ammonia vapor may condense.

Other embodiments of the invention may incorporate one or more "inserts" into the monolithic body of phase change material. In general, the term "insert" is used to describe any component other than the conductor and inductor that are substantially encapsulated in the phase change material. Different inserts may be used to provide different benefits. The inserts may be used to provide structural rigidity, thermal conductivity, vibration dampening or enhanced magnetic effect. The inserts may themselves be magnetic. These second magnets can be enhancement magnets, which are directly involved with the electromechanical functioning of the motor, or can be parts of a magnetic bearing (described in more detail below). The inserts may enhance heat transfer away from the bearing and stator. The inserts may enhance dampening of motor vibration. This may reduce audible noise as well as improve motor life and allow for closer data track spacing.

In the embodiment of FIG. 7, there are two inserts. Specifically, a central insert 260 in the form of an annular heat pipe is molded within the upper portion 240 of the body 214. The central insert 260 is molded concentrically with respect to the upper portion 240. A base insert 262, in the form of a hollow disc, is molded within the base 222 portion of the body 214. The central insert 260 and the base insert 262 serve to enhance the stiffness of the body 214. These inserts may also be internally formed to operate as heat pipes, which will improve the overall thermal conductivity of the body 214, and thereby improve motor performance. The inserts may also be used in combination with the body of phase change material being a thermoplastic having properties which allow it to dampen unwanted vibrations or audible noise. The plastic body 214 locks the inserts into position with a high degree of strength. These inserts may be entirely overmolded by plastic or alternatively portions of these inserts may be exposed. The motor 210 further includes stator 220, bearings 218, a rotor 212 with a shaft 216, magnet 228 and flux return ring 258.

Referring to FIG. 8, another embodiment of a motor 610 is shown. This embodiment includes similar components as the previous embodiments and in particular to the first embodiment. A monolithic body 614 is formed around stator 620 using an encapsulation method. The primary difference between this embodiment and the first embodiment is that the bearings 618 are spaced a substantially greater distance apart from the shaft 616 than the bearings 18 in the first embodiment. This spacing is achieved using an upper insert 670 and a lower insert 672 substantially encapsulated by the body 614. These inserts are preferably annular shaped, and act as extensions of the shaft 616. The upper insert 670 and the lower insert 672 have hollow chambers and can be constructed as heat pipes. In this embodiment, the shaft 616 is fixed to the body 614, partially by being fixed to the inserts. An additional advantage of this embodiment is that oversized bearings may be used. These larger bearings generally have a longer life and can be run at higher speeds for longer periods of time. These larger bearings more effectively dissipate heat from the bearing surface.

Another major advantage of this embodiment stems from the lower bearing being positioned on the lower section of the hub. This arrangement dramatically increases stiffness and reduces wobble during rotation. The inserts 670 and 672 also provide stiffness and are thermally conductive to dissipate heat.

In this embodiment rather than using metal inserts, cavities can be formed through lost wax casting, the cavities later being used as chambers for heat transfer fluids. Although such castings have relatively poor dimensional consistency, when the castings are placed in the mold in which the thermoplastic will be injected, the mold aligns the parts and the thermoplastic is easily molded to have the required external geometry. Thus the final part can be made to very close tolerances. Utilizing the invention, the mold and thermoplastic offset the need for repeatability in the casting size and shape. The resulting cavity can then have a heat transfer fluid and the cavity sealed, as described more fully with respect to the embodiment of FIG. 17 below.

Figure 9:
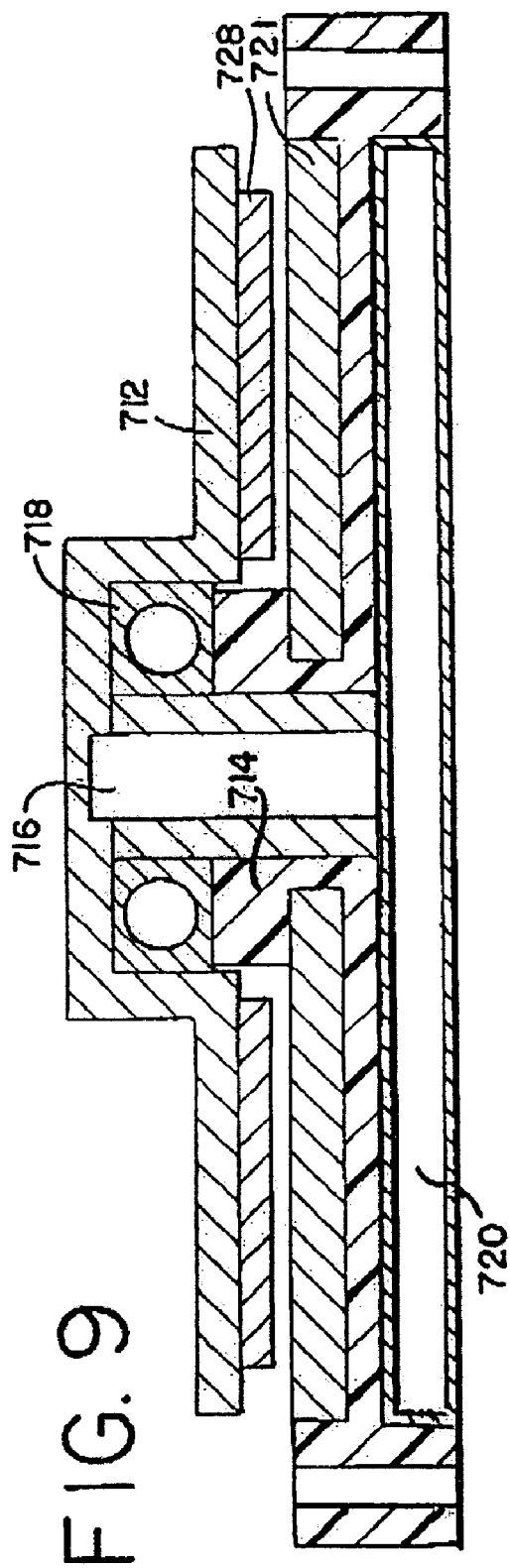
FIG. 9 is a cross-sectional view of a high speed motor in accordance with a fourth embodiment of the present invention.

Another embodiment of the invention is an axial flux motor, shown in FIG. 9. This embodiment includes a monolithic body 714 formed from an encapsulation method. The monolithic body substantially encapsulates a circuit board 721. Copper traces (not shown) are placed on the circuit board and serve as the conductors that create a plurality of magnetic fields. However, no steel core is used in this type of stator. Passing current through the traces generates magnetic fields which cooperate with fields in permanent magnet 728 attached to a rotor 712 to rotate the permanent magnet 728 and thereby rotate the disc support member 712, supported by bearings 718 on shaft 716. The circuit board is preferably a multilevel circuit board. A cold plate 720 is encapsulated into the bottom of the assembly. Cold plates (also known as heat pipe integrated slim cold plates) are available from Enertron, Inc. 2915 N. Nevada St., Chandler, Ariz. 85225.

Figure 10:
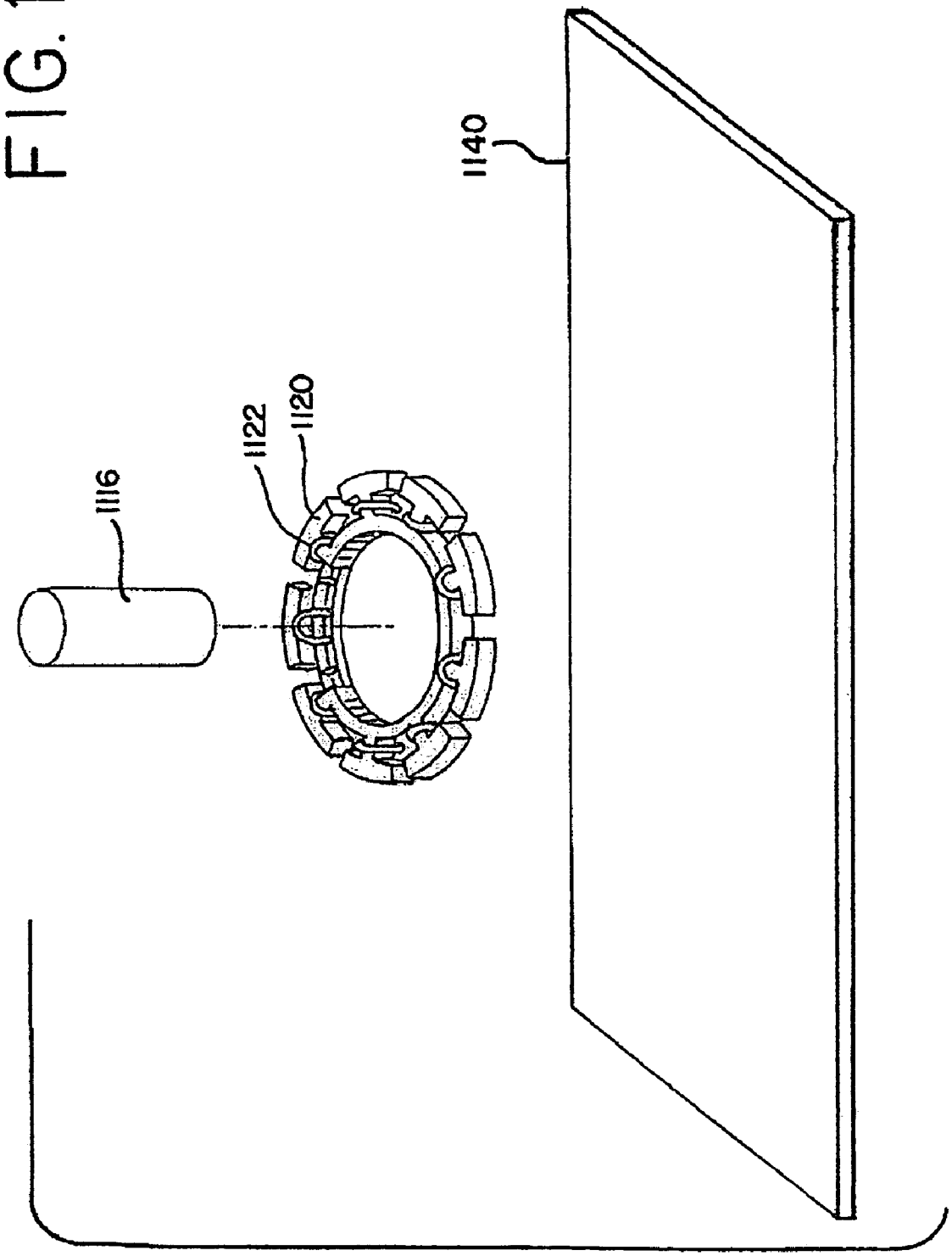
FIG. 10 is a perspective view of a stator, shaft and cold plate used in a fifth embodiment of the present invention.
Figure 11:
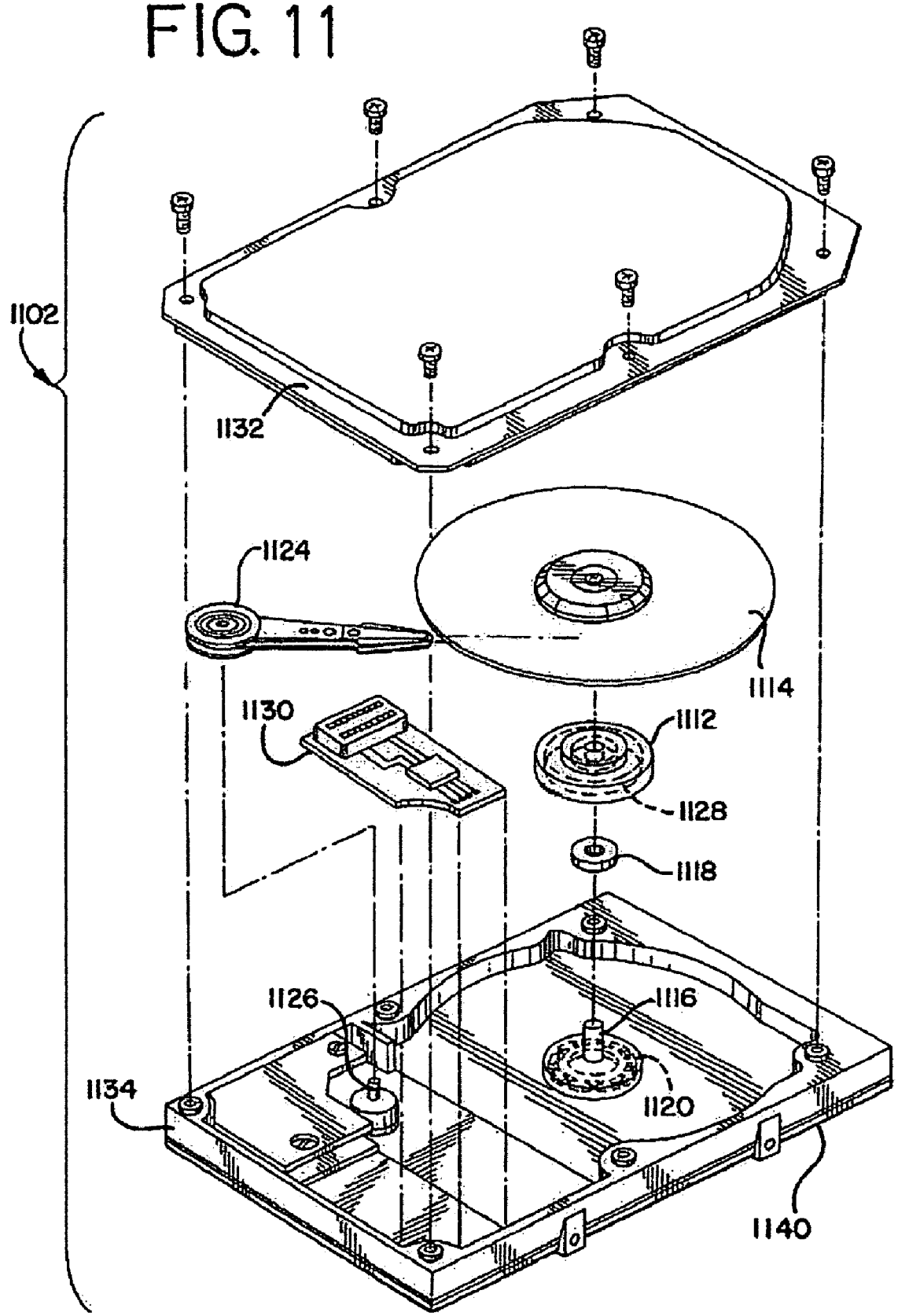
FIG. 11 is an exploded view of a hard disc drive of the present invention using the components of FIG. 10.

Another embodiment of the invention is a hard disc drive 1102 shown in FIGS. 10 and 11. The motors of the previous embodiment were designed to be manufactured separately and attached to the base or other housing components of a hard disc drive. In this embodiment, the base 1134 of the hard disc drive is made as part of an assembly that also substantially encapsulates the stator 1120. In this embodiment, a cold plate 1140 is also substantially encapsulated in the base. Even though the cold plate 1140 is covered by thermoplastic material on only one surface, it is a large surface, thus rigidly fixes the cold plate into the base. Thus the stator 1120 and cold plate 1140 are integrally connected together with good heat conduction away from the stator. In addition, the base of the hard disc drive may be made with details molded into the monolithic body such that the base can be used to easily form the part of the case for the device and support other internal components and provide in internal geometry required for operation of the part. While the embodiment disclosed in FIGS. 10 and 11 is for a hard disc drive, it will be readily apparent that the same concepts can be used to make housing parts for other consumer electronic devices, like a camera, cell phone, PDA, portable digital music player, portable video player and the like, that have an electromagnetic field-functioning device that generates heat during operation.

The stator 1120 with windings 1122 and shaft 1116 (FIG. 10) are preferably included into the base assembly 1134 (FIG. 11) when the body of phase change material is formed, such as by injection molding. Of course, the shaft 1116 could be added to the base assembly afterwards. Preferably, the body of phase change material is a monolithic body of thermoplastic material. The base assembly also preferably includes a second shaft 1126 supported by the body of phase change material. This second shaft 1126 is used to support the read/write head 1124 in operable proximity to one or more discs 1114 supported on hub 1112. The hub 1112 has a magnet 1128 connected thereto which is located in operable proximity to the stator 1120 when the hub is rotatably supported by bearing 1118 on shaft 1116. The hard disc drive 1102 preferably includes other components, such as a circuit board 1130, wiring, etc. that is commonly used in hard disc drives and therefore not further described. Of course, a cover 1132 is preferably included and attached to the base assembly by conventional methods. The cover and the base assembly cooperate to form a housing for the hard disc drive 1102.

One advantage of this embodiment of the invention is that the motor is built directly onto the base assembly, which also includes the cold plate, reducing the number of parts. Further, the other components of the hard disc drive can be aligned with the motor and disc or discs supported thereon.

As can be seen from the forgoing, electromagnetic field-functioning devices often include one or more, and generally a plurality, of solid parts used within the body of phase change material, such as bearings and inserts. In addition, there are solid parts that are near the body, such as a disc support member and a hard disc drive base. Preferably the phase change material used to make the body will have a CLTE such that the phase change material contracts and expands at approximately the same rate as the one or more solid parts. For example, the preferred phase change material should have a CLTE of between 70% and 130% of the CLTE of the parts substantially encapsulated in it. The phase change material should have a CLTE that is intermediate the maximum and minimum CLTE of the solid parts where the body is in contact with different materials. Also, the CLTE's of the body and solid part(s) should match throughout the temperature range of the device during its operation. An advantage of this method is that a more accurate tolerance may be achieved between the body and the solid parts because the CLTE of the body matches the CLTE of the solid parts more closely.

Most often the solid parts will be metal, and most frequently steel, copper and aluminum. The solid parts could also include ceramics. In almost all motors there will be metal bearings. Thus the phase change material used to encapsulate motor parts should have a CLTE approximately the same as that of the metal used to make the bearings.

Most thermoplastic materials have a relatively high CLTE. Some thermoplastic materials may have a CLTE at low temperatures that is similar to the CLTE of metal. However, at higher temperatures the CLTE does not match that of the metal. A preferred thermoplastic material will have a CLTE of less than $2 \times 10^{-5}$ in/in/° F., more preferably less than $1.5 \times 10^{-5}$ in/in/° F., throughout the expected operating temperature of the motor, and preferably throughout the range of 0-250° F. Most preferably, the CLTE will be between about $0.8 \times 10^{-5}$ in/in/° F. and about $1.2 \times 10^{-5}$ in/in/° F. throughout the range of 0-250° F. (When the measured CLTE of a material depends on the direction of measurement, the relevant CLTE for purposes of defining the present invention is the CLTE in the direction in which the CLTE is lowest.)

The CLTE of common solid parts used in an electromagnetic field-functioning device are as follows:

|  | 23° C. | 250° F. |
| --- | --- | --- |
| Steel | 0.5 | 0.8 ($\times 10^{-5}$ in/in/° F.) |
| Aluminum | 0.8 | 1.4 |
| Ceramic | 0.3 | 0.4 |

Of course, if the electromagnetic field-functioning device is designed with two or more different solids, such as steel and aluminum components, the CLTE of the phase change material would preferably be one that was intermediate, the maximum CLTE and the minimum CLTE of the different solids, such as 0.65 in/in/° F. at room temperature and $1.1 \times 10^{-5}$ in/in/° F. at 250° F.

One preferred thermoplastic material, Konduit OTF-212-11, was made into a thermoplastic body and tested for its coefficient of linear thermal expansion by a standard ASTM test method. It was found to have a CLTE in the range of −30 to 30° C. of $1.09 \times 10^{-5}$ in/in/° F. in the X direction and $1.26 \times 10^{-5}$ in/in/° F. in both the Y and Z directions, and a CLTE in the range of 100 to 240° C. of $1.28 \times 10^{-5}$ in/in/° F. in the X direction and $3.16 \times 10^{-5}$ in/in/° F. in both the Y and Z directions. (Hence, the relevant CLTE's for purposes of defining the invention are $1.09 \times 10^{-5}$ in/in/° F. and $1.28 \times 10^{-5}$ in/in/° F.) Another similar material, Konduit PDX-0-988, was found to have a CLTE in the range of −30 to 30° C. of $1.1 \times 10^{-5}$ in/in/° F. in the X direction and $1.46 \times 10^{-5}$ in/in/° F. in both the Y and Z directions, and a CLTE in the range of 100 to 240° C. of $1.16 \times 10^{-5}$ in/in/° F. in the X direction and $3.4 \times 10^{-5}$ in/in/° F. in both the Y and Z directions. By contrast, a PBS type polymer (Fortron 4665), was likewise tested. While it had a low CLTE in the range of −30 to 30° C. ($1.05 \times 10^{-5}$ in/in/° F. in the X direction and $1.33 \times 10^{-5}$ in/in/° F. in both the Y and Z directions), it had a much higher CLTE in the range of 100 to 240° C. ($1.94 \times 10^{-5}$ in/in/° F. in the X direction and $4.17 \times 10^{-5}$ in/in/° F. in both the Y and Z directions).

In addition to having a desirable CLTE, the preferred phase change material will also have a high thermal conductivity. A preferred thermoplastic material will have a thermal conductivity of at least 0.4 watts/meter° K using ASTM test procedure 0149 and tested at room temperature (23° C.).

Some electromagnetic field-functioning devices will have vibrations of concern, generally produced by harmonic oscillations. The phase change material can be selected so as to dampen oscillations at the harmonic frequency generated by operation of the electromagnetic field-functioning device, many of which are dependent on the configuration of the windings or other conductors and any moving parts. In the case of a motor used in a hard disc drive, the phase change material will preferably have a vibration dampening effect so that the motor and disc assembly has a reduction of harmonic oscillations.

There are a number of properties of the phase change material that can be varied in a way that will allow the phase change material to dampen different harmonic frequencies. This includes adding or varying the amount of glass, Kevlar, carbon or other fibers in the material; adding or varying the amount of ceramic filler in the material; changing the type of material, such as from polyphenyl sulfide to nylon or other liquid crystal polymers or aromatic polyesters, adding or grafting elastomers into a polymer used as the phase change material; and using a different molecular weight when the phase change material is a polymer. Any change that affects the flex modulus, elongation or surface hardness properties of the phase change material will also affect its vibration dampening characteristics.

One way to determine the effectiveness of vibration dampening, and thus to select a suitable material, is to make up motor or other device configurations where different phase change materials are used, and then measure the vibration dampening accomplished by each material. The vibration dampening can be measured with a capacitance probe or laser Doppler vibrometer. In the range of 200-2000 Hz, and preferably in the range of 300-2000 Hz, the electromagnetic field-functioning device of the present invention will preferably have an amplitude decrease of harmonic vibration of at least 5 and more preferably at least 10 decibels. In the audible range, 20-15,000 Hz, the dampening will preferably be at least 2, more preferably at least 5 decibels in reduction in harmonic frequency amplitude. These reductions are assessed based on a comparison of the vibrations of the same electromagnetic field-functioning device but without the component being encapsulated.

As mentioned above, another use of the present invention is a motor/generator used as power source for a hybrid electric vehicle. A motor/generator for such an application is shown in FIGS. 12-15. The motor/generator 270 includes a stator assembly 272 and a rotatably member, specifically a rotor 274, rotatably mounted to the stator assembly with bearings 276, specifically ball bearings. The stator assembly is made of core 273 made from steel laminations and providing poles, and multiple conductors in the form of windings 278 that, when the device is acting as a motor, induce a plurality of magnetic fields in the core 273 when electrical current is conducted by the conductors. Of course when the devise is being used as a generator, the moving magnetic fields induce an electrical current in the windings 278. The stator assembly also includes two end brackets 280 and 282 that connect the bearings 276 to the rest of the stator assembly. The laminations making the core 273 and windings 278 are substantially encapsulated by a body 284 of phase change material. The body 284 has extensions 285 on one end that fit through holes 286 (FIG. 14) and are heat staked (FIG. 13) to hold end bracket 280 onto the rest of the stator assembly. Terminals (not shown) connect the conductors 278 to a power supply or storage source external to the motor/generator. The terminals are partially encapsulated in the body 284.

The rotor 274 is hollow, and includes a hub 275 and a permanent magnet 277 connected thereto in operable proximity to the stator when the motor/generator is assembled. The hub connects to the engine drive shaft, not shown. The outside diameter of the rotor 274 is smaller than the inside diameter of the open center of the stator assembly so that the rotor fits inside the stator assembly.

Two liquid-tight coolant channels 286 are also substantially encapsulated in the body 284 of phase change material. The channels 286 may be molded into the body 284 when it is formed. A preferred method of forming the channels is to use a conduit that is put in place before the body 284 is solidified. The conduit may be metal or thermoplastic. In one embodiment the conduit is made out of the same thermoplastic material that is used to injection mold the body 284. Preferably any fittings 288 (FIGS. 14 and 15) needed to introduce and remove liquid from the coolant channels 286 are also partially encapsulated in the body 284 of phase change material. A conduit can be used that has a threaded boss at the end, bent at an angle so that it terminates flush with the end of the body 284, and the fitting 288 can be screwed into the boss of the conduit. Alternatively, after the body is formed with the coolant channels totally encapsulated, holes can be drilled through the bracket 282 and into the channels 286 and tapped so that the fittings 288 can screw into the stator assembly and establish a fluid communication with the coolant channels 286.

In a preferred embodiment, conduits filled with water or some other fluid are frozen into a desired shape. These solid conduits are then placed in an injection mold cavity along with the windings 278 and the core 273. Injection of thermoplastic material then fills the core to a predetermined plastic pressure and solidifies to form the body 284, with the channels being left when the water originally frozen into the conduit is removed from the molded body.

Figure 16:
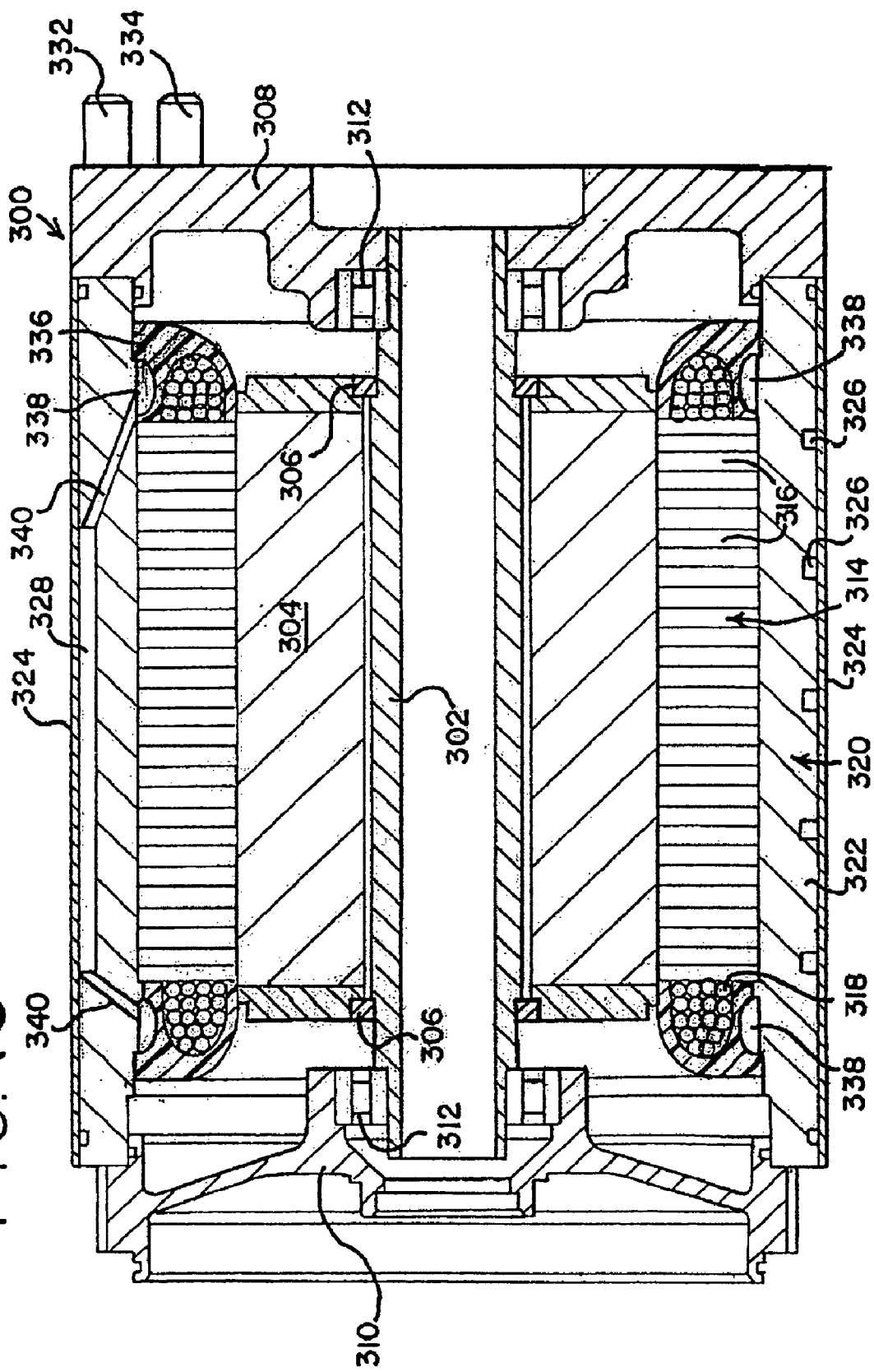
FIG. 16 is a cross-sectional view of a motor in accordance with a seventh embodiment of the invention.

FIG. 16 shows a motor 300 that utilizes two heat transfer fluid confinement members, one formed as part of a cooling jacket (which is known in the art) and one formed in a body of phase change material in accordance with one aspect of the present invention. Motors with cooling jackets are known in the art. The motor 300 includes a hollow shaft 302 to which a rotor 304 is attached by locking rings 306. The shaft is rotatably mounted to end brackets 308 and 310 by bearings 312. A stator 314 is made with laminations 316 making up a core and wire 318 that goes around the core to make multiple series of windings, allowing poles in the stator to be energized in a repeating fashion to induce a magnetic field and cause the rotor 304 to rotate.

Surrounding the stator 314 is a cooling jacket like that known in the art. The cooling jacket 320 includes an aluminum body 322 and a sheet metal cover 324. The aluminum body includes a plurality of circumferential channels 326 that tie into two manifolds 328, only one of which is shown in FIG. 16, at the ends of the channels 326. The channels 326 and manifolds 328 are machined into the aluminum body 322 before the sheet metal cover 324 is attached. Inlet 332 and outlet 324 nipples are provided on the motor 300 to connect with a flow of cooling fluid. The cooling fluid flows into one of the manifolds from inlet 332, around the circumference of the cooling jacket through channels 326, then from the other manifold to outlet 334.

The motor 300 is modified from other known motors with cooling jackets in that the stator is encapsulated with a body of phase change material 336. The body 336 completely encases the wire windings 318. When the body 336 is formed, preferably by injection molding, circumferential channels 338 are molded into the body near the end turns on the windings 318. The aluminum body 322 is modified to include cross channels 340 from the manifolds 328 to the channels 338 in body 336. In this manner, as a cooling fluid enters manifold 328 and flows through the channels 326 in the cooling jacket, it will also flow through cross channels 340 and then through the channels 338 which are located close to the windings 318 where heat is generated, then back out through another set of cross channels to the other manifold and out through outlet 334. Preferably the phase change material making up body 336 will have high coefficient of thermal conductivity, as described above, to aid the removal of heat from the stator 314. Thus in this fluid-cooled electromagnetic field-functioning device, a monolithic body of injection molded thermoplastic material substantially encapsulates the conductor, and a heat transfer fluid pathway is defined by at least one channel in the monolithic body covered by a mating component, in this case the aluminum body 322. There are of course other modifications of this aspect of the invention. Fluid channels could be formed by a mounting flange, or some other piece that forms an enclosure over a channel in a body of thermoplastic material. For example, in the motor/generator 270, fluid channels could be formed by molding channels, or machining channels after the molding, in the surface of the body 284 of phase change material that will be covered by end bracket 280. Then the end bracket 280 could be secured in such a fashion that the bracket 280 formed a mating component that sealed the channels, and thus defined fluid pathways.

Another embodiment of the motor 300 can be made with a coolant channel cooling the inductors in the rotor, either separately from, or in conjunction with cooling channels near the end turns of the windings. In such a device, a body of phase change material could be injection molded around the rotor 304. This body could include cooling channels, much like channels 338. Cooling fluid could be introduced through a hole in an end bracket 308 into the hollow shaft 302. Ports through the side wall of the shaft would fluidly connect with the channels in the body of phase change material encapsulating the rotor. Flow through the shaft and through those channels would provide good heat transfer from the rotor to the heat transfer fluid, thus limiting the rise of the temperature of the rotor.

Figure 17:
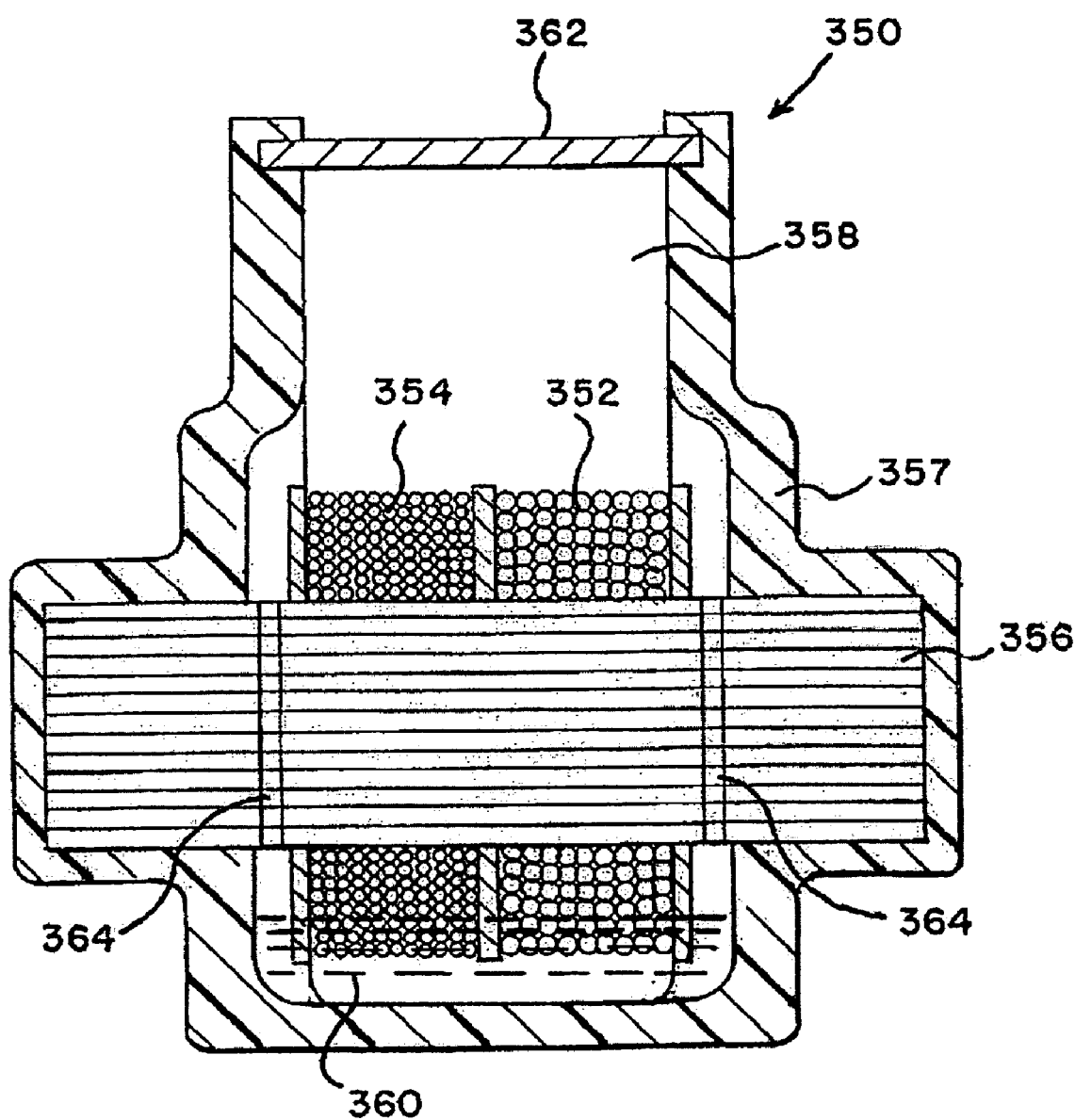
FIG. 17 is a cross-sectional view of a transformer in accordance with the invention.

FIG. 17 depicts a transformer 350 made according to the present invention. In this embodiment, the heat transfer fluid confinement member is made as a chamber in a body of phase change material. The chamber forms a sealed system. The transformer, as with other transformers, includes two conductors, a primary coil 352 and a secondary coil 354, as well as a lamination stack 356 which provides an inductor. The body of phase change material 357 is molded around the lamination stack 356 and forms the outer housing of the transformer 350. The body 357 includes chamber 358, which contains a heat transfer fluid 360. The monolithic body of thermoplastic material thus substantially encapsulates both the inductor and the heat transfer fluid confinement member. The chamber is sealed by a lid 362. Holes 364 are provided through the lamination stack 356 for the migration of the heat transfer fluid 360.

In operation, heat generated in the conductors causes the heat transfer fluid 360 to vaporize and rise to the top of chamber 358. Since it is cooler in the top section, the heat transfer fluid condenses and runs back into the bottom of the chamber 358. The phase change material, having good heat transfer properties, helps to transfer the heat from the lamination stack 356 to the heat transfer fluid. The thicknesses of the side walls (not shown to scale in the drawing) will be designed so that heat transfer up the walls will be minimized, thus keeping the wall sections near the lid 362, as well as the lid itself, at a cooler temperature, so that the heat transfer fluid can condense in the top portion of the chamber.

The chamber 358 in the transformer can be formed by injecting a gas into the molten phase change material during molding of the body 357. U.S. Pat. No. 6,037,038, hereby incorporated herein by reference, discloses a method of molding a hollow handle by injecting a fluid, such as nitrogen, through gas injection nozzles into a molten handle material. The same procedure may be used to form a hollow chamber having a non-linear shape for transformer 358. (By "non-linear" it is meant that the chamber or flow path cannot be formed by a simple core pin in an injection mold tool.) A process of controlling injection molding pressures described above and in U.S. Pat. No. 6,911,166 can be used to time the injection of the gas for coring and to determine the shape/position of the cavity formed by the gas. Alternatively, some other material (ice or wax) can provide a melting core to form the chamber 358.

After the chamber 358 is formed, and heat transfer fluid 360, such as an alcohol or aromatic hydrocarbon, is added, the cap 362 is used to seal the opening in the chamber. The cap can be either permanently installed, or a removable cap can be used if future replacement or addition of the heat transfer fluid 360 is contemplated. A plastic plug could be welded in place using ultrasonic, sonic or vibration welding after the fluid is added, or a metal cover could be attached with an O-Ring providing sealing at the interface.

Figure 18:
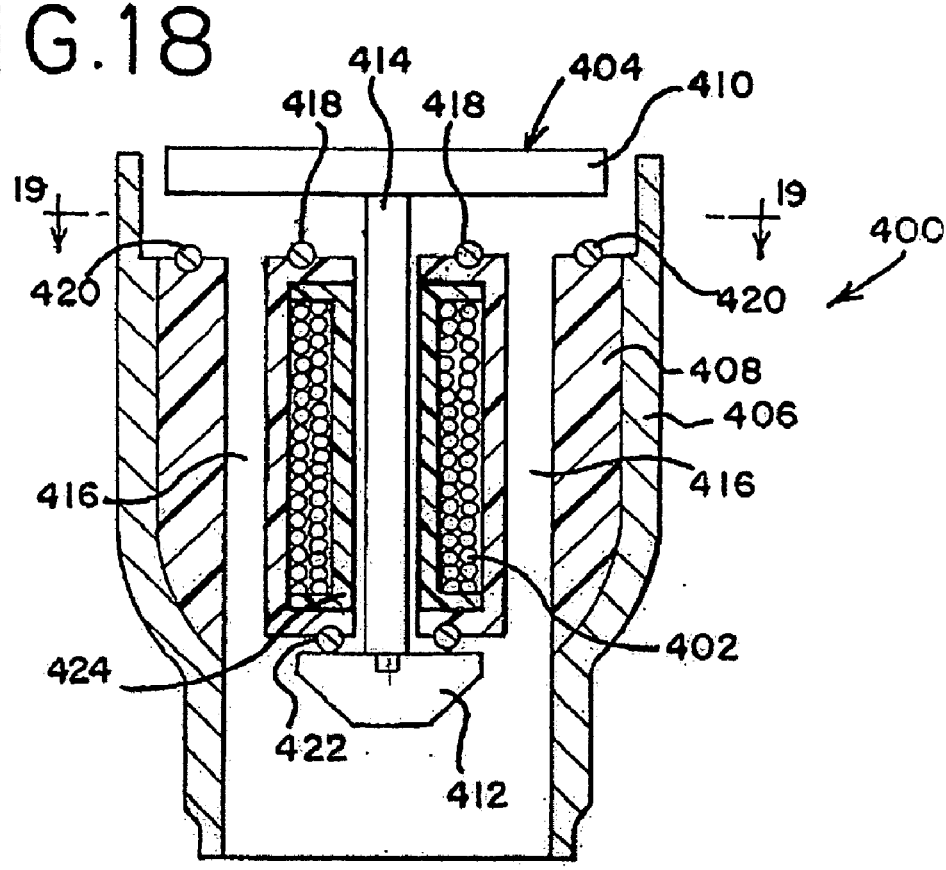
FIG. 18 is a cross-sectional view of a solenoid used in a fuel injector in accordance with the invention.
Figure 19:
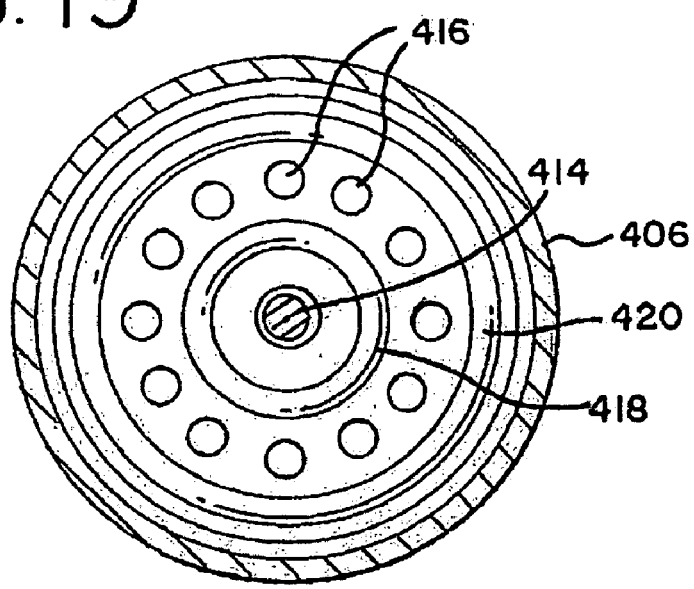
FIG. 19 is a cross-sectional view taken along line 19-19 of FIG. 18.

FIGS. 18 and 19 depict a solenoid valve 400 which may, for example, be part of a fuel injector. In this embodiment, the heat transfer fluid is a fluid, such as fuel, that is passing through the solenoid valve and is used for other purposes in addition to heat transfer. The valve includes a conductor 402 in the form of windings, a plunger 404, a metal shell 406 and a body of phase change material 408. The plunger 404 includes a fairly wide head 410, a seat 412 and a connecting rod 414. The body 408 includes a plurality of fluid ports 416 running parallel to the connecting rod 414. Molded in O-rings 418, 420 and 422 provide a shut off sealing surface against which the seat 412 (in the open position) or the head 410 (in the closed position) seals. In the open position (as shown) fuel can flow through the fluid ports 416.

The solenoid valve 400 may be constructed by forming (such as machining) the metal housing 406. The windings 402 are initially wound on a bobbin. The bobbin is then encapsulated by the body 408 of phase change material, leaving a central bore for connecting rod 414. The fluid ports 416 are also left as openings through the body 408 of phase change material. Later the plunger 404 is assembled.

During operation, current is conducted through the windings 402, which creates a magnetic field, drawing plunger 404 into an open position. A spring (not shown) is used to bias the plunger in a closed position.

The body 408 of phase change material provides good thermal conductivity from the windings 402 to the fluid passing through the fluid ports 416, and at the same time encapsulates the windings 402, protecting them from contact with the heat transfer fluid, which in this case may be a fuel. There is an additional benefit in that the fuel passing through the solenoid is heated, which will make it easier to be vaporized prior to combustion. The rest of the fuel injector is not shown or described, but operates in a conventional manner.

Figure 20:
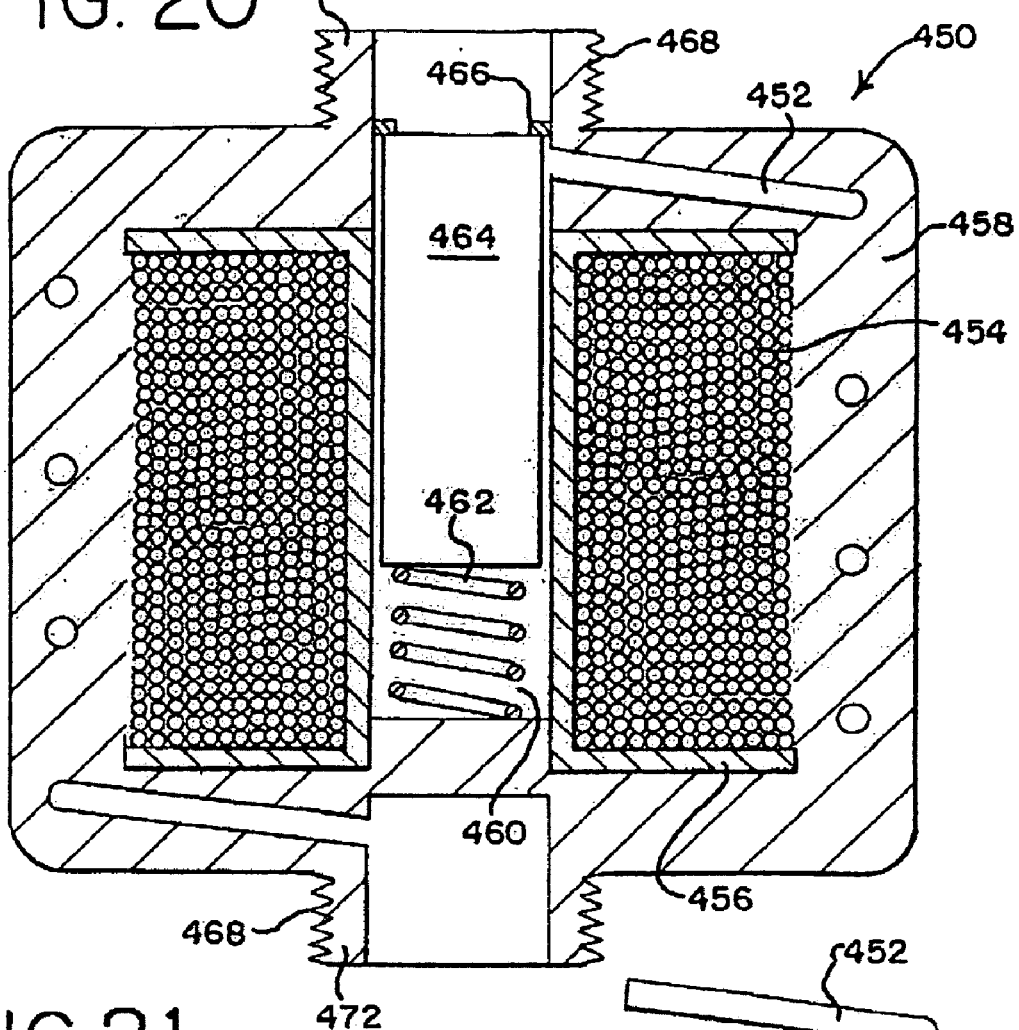
FIG. 20 is a cross-sectional view of a solenoid flow valve in accordance with the invention.
Figure 21:
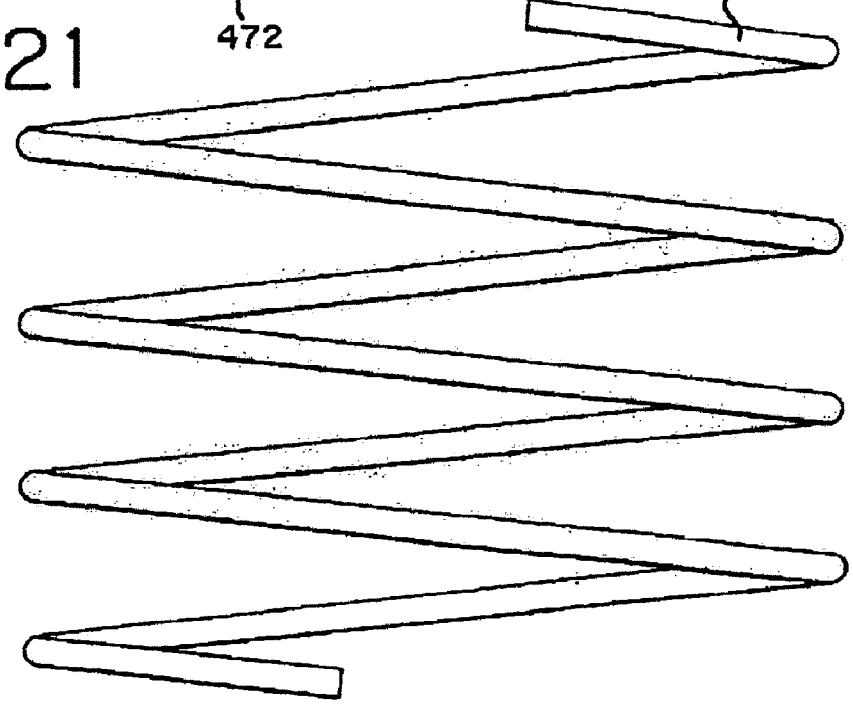
FIG. 21 is a perspective view of a heat transfer fluid confinement member used in the valve of FIG. 20.

A different solenoid valve 450 is shown in FIG. 20, and a part used to construct the valve is shown in FIG. 21. Like the valve 400, the solenoid operated valve 450 is also cooled by a heat transfer fluid, the flow of which is controlled by the valve.

FIG. 21 shows a conduit 452 formed in a helical shape. The conduit 452 may start out as an ice-filled tube. The valve 450 also includes a conductor 454 in the form of wire windings on a bobbin 456. The bobbin 456, wire 454 and conduit 452 are placed in a mold and a phase change material, such as a thermoplastic, is molded around the pieces to encapsulate them and form a body 458. Water melted from the ice originally in the conduit is emptied after the molding operation. A central channel 460 is left for placement of a spring 462 and plunger 464. An O-ring 466 is used to seal against the plunger 464 when the valve is closed (as shown). Pipe threads 468 may be molded onto the body 458 to form inlet 470 and outlet 472 connections.

Another embodiment of the invention is an electromagnetic field-functioning device for heating a fluid. Such a device includes at least one electrical conductor that generates heat when in use, and a monolithic body of injection molded thermoplastic material substantially encapsulating the conductor. A fluid pathway is also provided in the monolithic body, with at least one fluid inlet and at least one fluid outlet to allow for passage of fluid through the pathway. The outlet directs the fluid to a place of usage wherein heat picked up by the fluid as it is transferred through the device is put to functional use.

A good example of such a device is the solenoid of FIG. 18, in which the fuel passing through the device is heated to aid in vaporization of the fuel. Also, the solenoid valve 450 of FIG. 20 could be used in this manner, if the fluid flowing through the device is directed from the outlet to a place where heat picked up from the conductor 454 is put to a functional use. Another example of such a device is a water pump wherein the motor is used to heat water flowing through the pump by passing the fluid through the fluid pathway used to cool the conductors of the motor. This heated water may be directed to a heated pool of water, such as a hot tub, Jacuzzi tub or swimming pool. U.S. Pat. No. 5,172,754 discloses a heat exchanger for recovery of heat from a spa or hot tub pump motor. In the '754 patent, a heat exchange coil is wrapped around the outside of a motor. Water flows from the discharge side of the pump, through this heat exchange coiling, and is mixed with cooler water entering the pump. Rather than using a separate heat exchange coil, one pump embodiment of the present invention utilizes a fluid pathway through a monolithic body that encapsulates the windings for the pump motor, much like the fluid pathway formed by conduit 452 used in solenoid valve 450.

The heat transfer fluid does not need to be a liquid. An air blower may be powered by a motor, with air moved by the blower being directed through a fluid pathway formed in a monolithic body of phase change material substantially encapsulating the conductor (and/or inductor) of the motor powering the blower. The air would be heated by passing through the fluid pathway, and could then be directed to a place where the heat is put to a functional use, such as a breathing apparatus where the air is warmed before being directed to a patient. To further aid in heating the air, the bearings of the motor could also be encapsulated in the monolithic body of phase change material.

Another embodiment of the invention is a fluid conveying mechanism, such as a valve, pump or blower, that integrates fluid ports into the same monolithic body that encapsulates the conductor or inductor of the electromagnetic field-functioning device that powers the mechanism. The electromagnetic field-functioning device has at least one electrical conductor or inductor. A monolithic body of injection molded thermoplastic material substantially encapsulates the conductor and/or inductor. A fluid pathway is provided in the monolithic body through which at least a portion of the fluid conveyed by the mechanism passes. A fluid inlet port or outlet port, or both, are formed in the body of injection molded thermoplastic, and the pathway through the body is confined within the body. Thus the pathway is a defined pathway through a housing that is formed, at least in part, out of the same monolithic body that encapsulates the conductor or inductor. The fluid inlet and fluid outlet may be in the form of a plumbing fitting.

Most prior art pumps are attached to a motor in such a way that an impeller is turned by a shaft. The motor and the impeller are in different housings, and a seal around the shaft keeps liquid being conveyed by the pump from coming into contact with the components of the pump motor. U.S. Pat. No. 4,944,653 describes such a plastic pump motor assembly, where the motor is mounted in a cantilever fashion with respect to a separate pump casing 37. The motor shaft extends through an opening 39 in the casing and a seal 64 prevents water leakage. Some embodiments of the invention make it possible to make a pump/motor assembly without a separate pump housing. The present invention can be applied to a well pump. Through encapsulation, the motor can be installed inside the pump casing. The fluid transported by the pump can circulate through apertures formed in the encapsulant. The benefit is a smaller structure that is quieter. The shaft/pump casing interface is eliminated. U.S. Pat. No. 6,659,737 (hereby incorporated herein by reference) discloses a pump that can be modified according to the present invention so that the thermoplastic encapsulating the stator body is also used to form the housing for the device. In such an embodiment, the stator would be constructed without the shaft and held on a core pin in a mold. The inside surface of the mold would form the outside of the housing. The housing would have a larger inlet than depicted in the '737 patent, one that would allow the motor shaft and impeller to be added to the stator after the molding operation. The flow path through the plastic could be formed by either injecting gas into the molten plastic in the mold so as to produce channels, or by molding around a plurality of conduits filled with ice or wax which could later be removed to leave an integrated flow path through the body. In either manner, a fluid inlet port and a fluid outlet port could be formed in the body of injection molded thermoplastic, and the pathway through the body would be confined within the body. Thus the pathway is a defined pathway through a housing that is formed, at least in part, out of the same monolithic body that encapsulates the conductor. Rather than having a two-part housing that is separately molded and attached to an encapsulated stator, one monolithic body would be formed that encapsulates the stator and forms the flow channels through the device.

While the chamber for the transformer in FIG. 17 can be formed by injecting a gas into the thermoplastic while it is injected into the mold, other coolant channels for other electromagnetic field-functioning devices may be formed in a similar manner. As the thermoplastic is filling the tool, nitrogen is injected into the molten plastic to form the hollow section in the shaft and create a hollow cavity that is conformal to the wire and laminations.

While exemplary methods of cooling the different devices have been depicted in the drawings, the present invention contemplates using the various methods on other devices than those in which it is specifically shown in the drawings. For example, while small spindle motors would not typically be cooled by a liquid that flows into and out of the motor, there may be applications where this is practical. Then the cooling channels shown in the devices of FIGS. 12-16 and 20-21 could be used in the body of phase change material encapsulating the stator. The various cooling techniques can be applied to relays, and other electromagnetic field-functioning devices. Likewise, motors could be made where chambers were formed in the body of phase change material, a heat transfer fluid is added to the chamber, and the chamber sealed, like the transformer of FIG. 17. Heat pipes and cold plates could be substantially encapsulated in the phase change material encapsulating the conductors of devices other than the motors of FIGS. 2-11. Rather than encapsulating the conductors and the heat exchange member together, in some devices an inductor will preferably be encapsulated with a heat exchange member, like the transformer of FIG. 17. Gas-assist molding, such as can be used to make the chamber in the transformer of FIG. 17, can be used to form cooling channels or chambers in other products.

Where the heat exchange member involves a working fluid that is vaporized during operation of the device, such is in a heat pipe, or in the chamber 358 in transformer 350, the working fluid will preferable be a heat transfer fluid substantially vaporizable at a temperature in the range of operating temperatures expected for the device, which will typically be between about 25° C. and about 200° C. Of course the temperature at which a liquid will vaporize is a function of the pressure at which the system is operating, which for sealed systems is usually also a function of temperature. However, the heat transfer fluid will be chosen such that it will vaporize in this temperature range for the expected internal pressure of the system in which it is used.

While the presently preferred embodiments utilize injection molding to form the monolithic bodies of phase change material, other methods of molding, such as blow molding, compression molding, casting, roto-molding, reaction injection molding or combinations of such methods may be used.

One unique aspect of the invention is that a variety of cooling channels or heat pipes can be encapsulated in different parts made using the same mold tool. For example, heat pipes that vary with respect to one or more of their dimensions, such as their diameter and/or their thickness, may fit within the same mold tool. As a result, different heat pipes can be encapsulated and used to build a variety of motors or other electromagnetic filed functioning devices. Not only does this reduce the number of mold tools that are needed, but the final assemblies will have a final uniform size and shape, since the phase change material body will have the same dimensions for each. As a result, other components of the device, such as the housing, can be constant between different products.

Following is a summary of some of the benefits of preferred embodiments of the invention.

With coolant channels encapsulated in the body of phase change material also encapsulating the stator windings and core, heat generated in the stator can be easily removed by circulating a liquid through the cooling channels. The liquid is totally contained, unlike air blown by a fan blade attached to a motor shaft. Motors using this invention thus can be made smaller but run highly loaded, or at high speeds, with more turns of finer wire. In the past such small motors would get too hot, but with the present invention, and the improved methods of removing heat from the motor, this problem is eliminated.

A number of other ways to improve thermal conductivity are provided. First, the phase change material will itself provide some heat dissipation. Second, the phase change material can include additives that will enhance its thermal conductivity. Third, heat conductive inserts can be included in the motor or other electromagnetic field-functioning device. Fourth, the body of phase change material, by being in contact with a number of parts of the motor and/or disc drive, can act as a pathway for heat such that those other parts of the motor and/or disc drive can act as heat sinks. This improved thermal conductivity provides longer life to the electrical and bearing components of the device, with higher efficiency and lower current draw. If the device is a motor/generator used for a hybrid vehicle, it will also provide the opportunity to create more electricity to power the drive motor or recharge the batteries and improve overall fuel efficiency.

The encapsulation protects the windings from the environment, as well as the liquid used to cool the motor, while offering the opportunity to heat a fluid in operable proximity to the electromagnetic device. The use of retracting positioning pins and gas injection allows complete encasement of components of the electromagnetic field-functioning device inside a layer of phase change material. For example, in the motor/generator used in a hybrid electric vehicle, the conductors are encased and protected from flying debris.

The present invention can be used with electromagnetic devices having laminated cores and wire windings. It can also be used on devices using sintered inductive cores and permanent magnets as well as multilayer circuit board configuration or coils on a circuit board.

The device designs allow for unique manufacturing possibilities. The laminations and windings do not need to be separately cleaned and, once the assembly has been encapsulated, it will not generate contaminants. The device can be cleaned via ultrasonic cleaning, steam, chemical sterilization, which is important in medical and food processing industries. In addition, if inserts are encapsulated and then machined to provide precise dimensions, one cleaning step can be used after all fabrication steps. It is not practical to do this type of machining on assembled parts without the present invention because there is no practical way to clean the entire assembly after such a machining operation. Cellular manufacturing technology can be used. The device can be made anywhere and then cleaned just before being assembled. There is no need for costly packaging to keep the assembly clean. Also, the durability of the assembly allows for low cost shipping.

The use of an encapsulated stator allows the fluid connectors to be integrated into the body. Separate fluid ports and reservoirs are unnecessary In general, the device can be more easily assembled and will include fewer parts. As noted above, the stack-up tolerances are reduced because components are eliminated and the tolerances associated with assembly operations disappear. The phase change material can be designed with a CLTE that closely approximates that of other components. By matching CLTE, one also obtains better environmental conditions. Otherwise, plastics get microcracks during thermal cycling, which allow moisture or other fluids to attack the encapsulated components.

There are a number of cost benefits associated with aspects of the present invention. There are cost benefits from fewer components. The manufacturing process has reduced costs. The device can be smaller requiring less copper or steel. Components do not need the same level of dimensional precision. There are also benefits associated with development time and cost for electromagnetic configurations. Design implementation can be faster. First, since there are fewer parts, less parts have to be designed for each new motor. Second, fewer tools are needed, since fewer parts are required. Third, injection molding tools are modular in nature. This allows tooling to be easily customized without requiring a redesign of the whole tool. In many cases, one tool can be used for multiple product designs and iterations. For example, plastic molding tools might be able to be used with multiple cooling systems.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

The invention claimed is:

1. An electromagnetic field-functioning device for heating a fluid comprising:
   a) a magnetically inducible core and at least one electrical conductor that creates a magnetic field in the core when electrical current is conducted through the conductor and generates heat when in use;
   b) a monolithic body of injection molded thermoplastic material substantially encapsulating the at least one conductor; and
   c) a fluid pathway at least partially embedded in and integral with the monolithic body, with at least one fluid inlet and at least one fluid outlet to said pathway to allow for passage of fluid through the pathway, the outlet directing the fluid to a place of usage wherein heat picked up by the fluid as it transfers through the device is put to functional use.

2. A water pump comprising the electromagnetic field-functioning device of claim 1 wherein the device is in the form of a motor, and water flowing through the pump is heated by passing through the fluid pathway.

3. The pump of claim 2 wherein the water passing through the fluid pathway is directed to a heated pool of water.

4. A hot tub comprising the pump of claim 2.

5. A Jacuzzi tub comprising the pump of claim 2.

6. A water circulation system for a swimming pool comprising the pump of claim 2.

7. The electromagnetic field-functioning device of claim 1 wherein the fluid pathway is provided by a conduit substantially encapsulated in the monolithic body.

8. The electromagnetic field-functioning device of claim 1 wherein the fluid pathway comprises a channel formed by gas injection during a molding operation of the thermoplastic material.

9. The electromagnetic field-functioning device of claim 1 wherein the passageway is formed by substantially encapsulating a solidified material that is normally liquid at room temperature during a molding operation of the thermoplastic material.

10. The electromagnetic field-functioning device of claim 9 wherein the passageway is formed by substantially encapsulating water frozen in a conduit having a desired shape during a molding operation of the thermoplastic material.

11. The electromagnetic field-functioning device of claim 1 wherein the device comprises a motor.

12. The electromagnetic field-functioning device of claim 1 wherein the device comprises a solenoid.

13. A fuel injector comprising the solenoid of claim 12.

14. The electromagnetic field-functioning device of claim 1 wherein the device comprises a generator.

15. A fuel injector comprising the device of claim 1.

16. The electromagnetic field-functioning device of claim 1 wherein the device comprises a solenoid valve, with the at least one conductor comprising windings for the solenoid.

17. The electromagnetic field-functioning device of claim 1 wherein the monolithic body of injection molded thermoplastic material completely encapsulates the at least one conductor such that the device can be submerged in a liquid without the liquid contacting the at least one conductor.

18. A blower comprising the electromagnetic field-functioning device of claim 1 wherein the device is in the form of a motor, and air flowing through the blower is heated by passing through the fluid pathway.

19. The blower of claim 18 wherein bearings in the motor are also encapsulated in the body of phase change material.

20. An electromagnetic field-functioning device for heating a fluid comprising:
   a) a magnetically inducible core and at least one electrical conductor that creates a magnetic field in the core when electrical current is conducted through the conductor and generates heat when in use;
   b) a monolithic body of injection molded thermoplastic material substantially encapsulating the at least one conductor; and
   c) a fluid pathway at least partially embedded in and integral with the monolithic body, with at least one fluid inlet and at least one fluid outlet to said pathway to allow for passage of fluid through the pathway, the outlet directing the fluid to a place of usage wherein heat picked up by the fluid as it transfers through the device is put to functional use, and further wherein the monolithic body completely surrounds the device except for the inlet and the outlet.

21. An electromagnetic field-functioning device for heating a fluid comprising:
   a) at least one electrical conductor and at least one magnetically inducible inductor that generates heat when in use and that creates a magnetic field in the inductor when electrical current is conducted through the conductor;
   b) a monolithic body of injection molded thermoplastic material substantially encapsulating the at least one inductor; and
   c) a fluid pathway at least partially embedded in and integral with the monolithic body, with at least one fluid inlet and at least one fluid outlet to said pathway to allow for passage of fluid through the pathway, the outlet directing the fluid to a place of usage wherein heat picked up by the fluid as it transfers through the device is put to functional use.

22. A blower comprising the electromagnetic field-functioning device of claim 21 wherein the device is in the form of a motor, and air flowing through the blower is heated by passing through the fluid pathway.

23. The blower of claim 22 wherein bearings in the motor are also encapsulated in the body of phase change material.

24. A fluid conveying mechanism comprising:
   a) an electromagnetic field-functioning device having a magnetically inducible core and at least one electrical conductor that creates a magnetic field in the core when electrical current is conducted through the conductor;
   b) a monolithic body of injection molded thermoplastic material substantially encapsulating the at least one conductor; and
   c) a fluid pathway at least partially embedded in and integral with the monolithic body, with at least one of a fluid inlet into the pathway and a fluid outlet from the pathway being formed in the body of injection molded thermoplastic, and the pathway through the body being confined within the body.

25. The fluid conveying mechanism of claim 24 wherein the device is operable to power fluid conveyance through the mechanism and at least a portion of the fluid conveyed by the mechanism passes through the fluid pathway in the monolithic body.

26. The fluid conveying mechanism of claim 24 wherein the mechanism is selected from the group consisting of valves, pumps and blowers.

27. The fluid conveying mechanism of claim 24 wherein said at least one of a fluid inlet and a fluid outlet is in the form of a plumbing fitting.

* * * * *